US011210818B2

(12) United States Patent
Ngoi et al.

(10) Patent No.: US 11,210,818 B2
(45) Date of Patent: Dec. 28, 2021

(54) RESOURCE MAPPING SERVER AND SYSTEM

(71) Applicant: Pacific Gas and Electric Company, San Francisco, CA (US)

(72) Inventors: John Shinn Taik Ngoi, Fremont, CA (US); Elizabeth Rose Baune, Alameda, CA (US); Stephen Douglas Hall, San Ramon, CA (US); Mark Richard Seveska, Napa, CA (US); Anthony Francis Morabe, San Mateo, CA (US); Vinay Vasa, San Ramon, CA (US); Potriadian Subramanian, Concord, CA (US); George Raja Nadar, Mountain House, CA (US); Alan Paul Gile, Clayton, CA (US); Andrew HunzekerHesed, San Francisco, CA (US); Shelby Warner, Moraga, CA (US); Michael Robert Wolf, Oakland, CA (US)

(73) Assignee: PACIFIC GAS AND ELECTRIC COMPANY, San Francisco, CA (US)

( * ) Notice: Subject to any disclaimer, the term of this patent is extended or adjusted under 35 U.S.C. 154(b) by 0 days.

(21) Appl. No.: 16/419,899

(22) Filed: May 22, 2019

(65) Prior Publication Data

US 2019/0362523 A1 Nov. 28, 2019

Related U.S. Application Data

(60) Provisional application No. 62/675,023, filed on May 22, 2018, provisional application No. 62/791,319, filed on Jan. 11, 2019.

(51) Int. Cl.
*G06T 11/00* (2006.01)
*G08B 27/00* (2006.01)
*G06Q 50/06* (2012.01)

(52) U.S. Cl.
CPC ............ *G06T 11/001* (2013.01); *G06Q 50/06* (2013.01); *G08B 27/001* (2013.01); *G08B 27/008* (2013.01)

(58) Field of Classification Search
CPC .... G06Q 50/06; G06T 11/001; G08B 27/001; G08B 27/008
See application file for complete search history.

(56) References Cited

U.S. PATENT DOCUMENTS 8,341,106 B1 * 12/2012 Scolnicov ................. G01F 1/50
706/47
9,807,599 B1 10/2017 Schanker et al.
(Continued)

FOREIGN PATENT DOCUMENTS

WO 2015058133 A1 4/2015

OTHER PUBLICATIONS

International Search Report and Written Opinion for International Application No. PCT/US2019/033596, dated Sep. 18, 2019, 11 pages.

*Primary Examiner* — Terrell M Robinson
(74) *Attorney, Agent, or Firm* — Greenberg Traurig, LLP

(57) ABSTRACT

Some embodiments include a server system including a computing device configured to be coupled to a communications network, a user device, a mapping database with mapping data, and an asset or infrastructure database including asset or infrastructure data. Program logic can receive a data communication including location information from the user device and display a map and asset or infrastructure information and a graphical user interface (GUI) on a display of the user device. Displayed information can be related to an emergency or safety alert, a condition related to (Continued)

asset or infrastructure data, or a response or status of assets or infrastructure to an environmental factor or human-made phenomenon.

18 Claims, 44 Drawing Sheets

(56) References Cited

U.S. PATENT DOCUMENTS

| | | | |
|---|---|---|---|
| 10,045,187 B1* | 8/2018 | Soleimani | H04W 4/023 |
| 2005/0034075 A1* | 2/2005 | Riegelman | G08B 25/016 |
| | | | 715/714 |
| 2005/0090201 A1* | 4/2005 | Lengies | H04B 7/18506 |
| | | | 455/41.2 |
| 2008/0180319 A1* | 7/2008 | Islam | G01C 15/00 |
| | | | 342/357.48 |
| 2008/0262734 A1* | 10/2008 | Manson | H04L 67/34 |
| | | | 702/5 |
| 2012/0233046 A1* | 9/2012 | Joyce, Jr. | G06Q 10/087 |
| | | | 705/35 |
| 2013/0091452 A1* | 4/2013 | Sorden | E21B 47/04 |
| | | | 715/771 |
| 2013/0097545 A1 | 4/2013 | Grewal | |
| 2016/0146696 A1* | 5/2016 | Steele | G01P 13/02 |
| | | | 702/51 |
| 2016/0343093 A1 | 11/2016 | Riland et al. | |
| 2017/0358068 A1 | 12/2017 | Strebel et al. | |
| 2018/0139112 A1* | 5/2018 | Davis | G06Q 30/0242 |

* cited by examiner

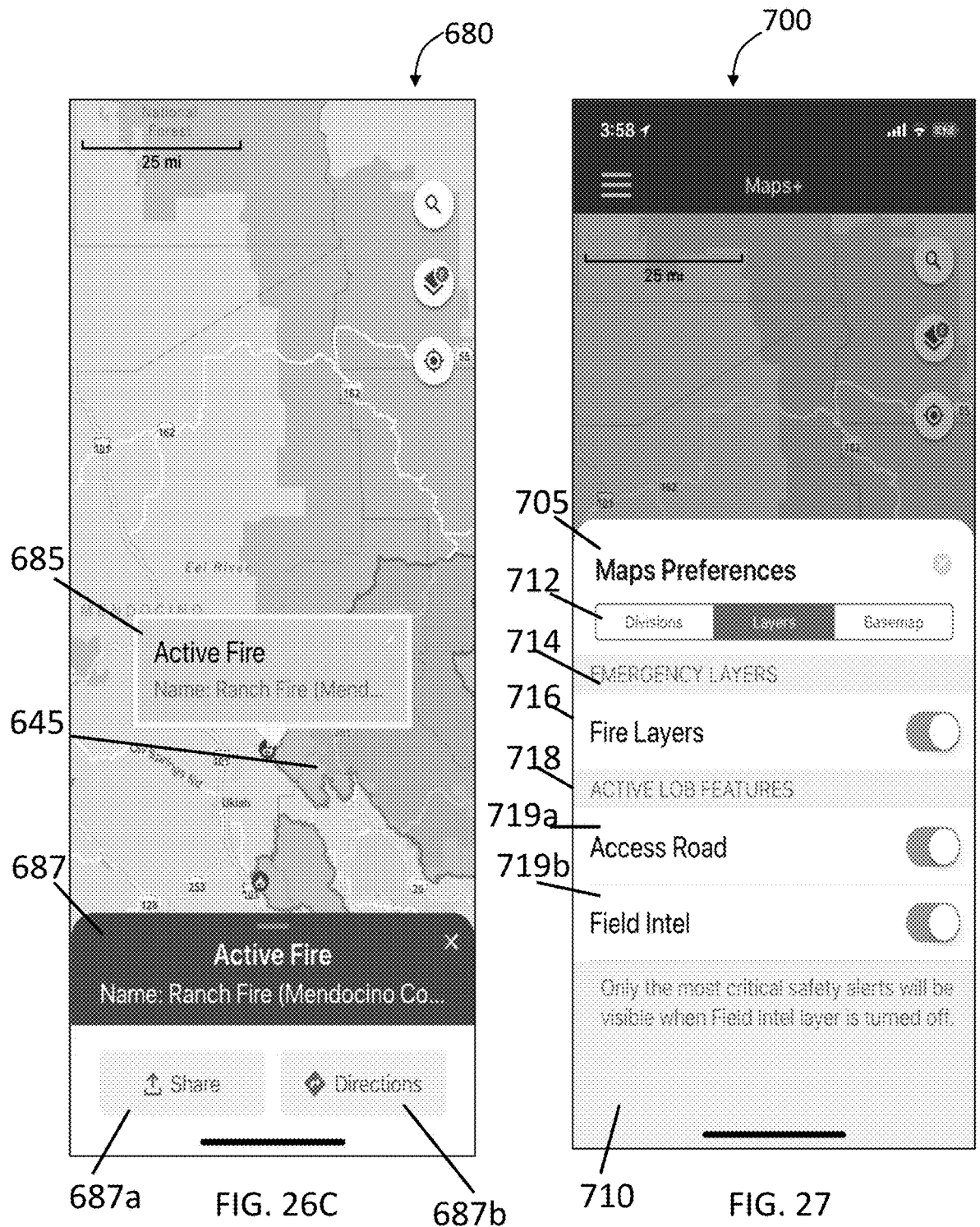

FIG. 43

RESOURCE MAPPING SERVER AND SYSTEM

CROSS-REFERENCE TO RELATED APPLICATIONS

This application claims the benefit of and priority to U.S. Provisional Patent Application No. 62/675,023, filed May 22, 2018, entitled, "RESOURCE MAPPING SERVER AND SYSTEM", and to U.S. Provisional Patent Application No. 62/791,319, filed Jan. 11, 2019, entitled, "RESOURCE MAPPING SERVER AND SYSTEM", the entire contents of which are incorporated herein by reference.

BACKGROUND

Utility workers are often provided with various sources of data and information related to one or more resources or assets such as digital information including text files, emails, instant messages, video files, images files, and/or physical files such as printed versions thereof. These workers generally find they can easily lose track of and/or ineffectively manage their resource or asset related information. Moreover, they can be overwhelmed with too many disparate information sources, and may find themselves being required to search across too many platforms or information sources.

Regulatory and compliance and gas leak surveys are usually documented on paper requiring a significant manual work-load. Once the work is documented on paper, workers often find it difficult to perform analytics on the data. By digitizing the process and allowing the inspectors to dynamically collect more data than is required for compliance, utility companies would be able to make better decisions regarding asset maintenance and replacement.

It is generally recognized that numerous aspects of resource mapping using one or more data resources, including those described above and those available on the internet or an intranet, can create a technical problem, especially for mobile workers in-the-field that require near real-time or real-time resource or asset analysis which would otherwise require significant manual effort. Thus, there exists a need for a technological solution to improve the resource mapping using computing devices/servers providing seamless in-the-field access to resource and asset information databases, and with automated functionality that effectively and more efficiently manages, controls, and distributes resource and asset mapping and related information services.

Fires and other natural disasters affect many states causing billions of dollars in damages and claims, and can severely impact utilities in the affected vicinity or region. Systems that can provide emergency information in the form of emergency layers on a map view displayed on a mobile device could assist users responding to the emergency.

SUMMARY OF THE INVENTION

Some embodiments include a server system comprising a computing device including at least one processor configured to be coupled to a communications network, and at least one user device configured to be coupled to the communications network. Some embodiments include a non-transitory computer-readable storage medium for tangibly storing thereon program logic for execution by the at least one processor comprising logic executable by the at least one processor for receiving at least one data communication from the at least one user device, and logic executed by the at least one processor to generate and display at least one graphical user interface (GUI) on at least one user display coupled to the communications network. Further, some embodiments include logic executed by the at least one processor to communicatively couple to at least one mapping database comprising mapping data. Further, some embodiments include logic executed by the at least one processor to communicatively couple to at least one asset or infrastructure database comprising asset or infrastructure data. Further, some embodiments include logic executed by the at least one processor to receive location data from at least one of at least one user device and a server communicatively coupled to the at least one user device. Further, some embodiments include logic executed by the at least one processor to receive at least a portion of the mapping data from the mapping database and display at least a portion of at least one map on a display of the at least one user device based at least in part on the mapping data. Further, some embodiments include logic executed by the at least one processor to process and display information derived from at least a portion of the asset or infrastructure data based on at least one condition.

In some embodiments, the location data is based at least in part on at least one of a physical location of the at least one user device and geo-positional data received from at least one of the at least one user device and the server communicatively coupled to the at least one user device.

In some embodiments, the at least one map includes a representation of an area that is a specified distance from the physical location of the at least one user device. Further, some embodiments include at least one map is based at least in part on at least one of a physical location of the at least one user device and geo-positional data received from at least one of the at least one user device and the server communicatively coupled to the at least one user device.

In some embodiments, the at least one map includes a representation of at least one asset. In some embodiments, the at least one asset comprises infrastructure related to delivery of at least one of electricity, fuel, and water. In some embodiments, the at least one map includes a representation of at least one ongoing or past emergency.

Some embodiments further comprise logic executed by the at least one processor to generate and display a user-selectable menu, an information or data field, and a toggle, on the at least one graphical user interface (GUI). In some embodiments, the at least one data communication comprises user input to a user selectable menu, an information or data field, and a toggle.

In some embodiments, the information or data field comprises at least one of field intelligence, service location, asset infrastructure, asset attributes, emergency information, safety information, satellite imagery, status of assets, asset use, a response of assets to an environmental factor or human-made phenomenon. In some embodiments, the user-selectable menu comprises at least one of a sharing function, email function, a notes function, a copy or save function, and a directions function.

In some embodiments, the at least one map includes an overlay of at least one of satellite imagery, a fire operational layer, an outage layer, and a fire layer. In some embodiments, the outage layer comprises at least one of a display of an outage and an outage perimeter. In some embodiments, the fire layer comprises an active fire and an active fire perimeter.

Some embodiments include logic executable by the at least one processor to process at least one asset search request from the at least one user device, and based on a result of the at least one asset search, displaying location of at least one asset, a graphical representation of at least one asset, an asset name, asset structure or component information, and resource information of the asset.

In some embodiments, the at least one condition comprises a physical location of the asset or infrastructure relative to an area or region displayed by the at least one map. In some embodiments, the at least one condition comprises the data communication, user-input to the at least one user display, an emergency or safety alert or condition related to the asset or infrastructure or based on an area or region displayed by the at least one map.

Some embodiments include a server system comprising a computing device including at least one processor configured to be coupled to a communications network. In some embodiments, the at least one user device is configured to be coupled to the communications network. Further, some embodiments include at least one mapping database comprising mapping data. Further, some embodiments include at least one asset or infrastructure database comprising asset or infrastructure data. Further, some embodiments include a non-transitory computer-readable storage medium for tangibly storing thereon program logic for execution by the at least one processor. In some embodiments, the program logic comprises logic executable by the at least one processor for receiving at least one data communication from the at least one user device and for displaying at least one graphical user interface (GUI) on a display of the at least one user device.

Some embodiments include logic executed by the at least one processor to receive location data from at least one of at least one user device and a server communicatively coupled to the at least one user device. Some embodiments include logic executed by the at least one processor to utilize at least a portion of the mapping data to display at least a portion of at least one map on the display. Further, some embodiments include logic executed by the at least one processor to utilize at least a portion of the asset or infrastructure data to display asset or infrastructure information on the display.

In some embodiments, the at least one map is based at least in part on at least one of a physical location of the at least one user device and geo-positional data received from at least one of the at least one user device and a server communicatively coupled to the at least one user device. Some other embodiments further comprise logic executed by the at least one processor to display information related to at least one of an emergency or safety alert or condition related to the asset or infrastructure data, and response or status of assets or infrastructure to an environmental factor or human-made phenomenon.

DESCRIPTION OF THE DRAWINGS

FIG. 26C illustrates a display of a close-up or enlarged portion of the resource map of FIG. 26A including identification and information sharing accordance with some embodiments of the invention.

FIG. 27 illustrates a display of a resource map with emergency mode map preference and settings in accordance with some embodiments of the invention.

FIG. 43 illustrates an activity summary display in accordance with some embodiments of the invention.

DETAILED DESCRIPTION

Figure 1:
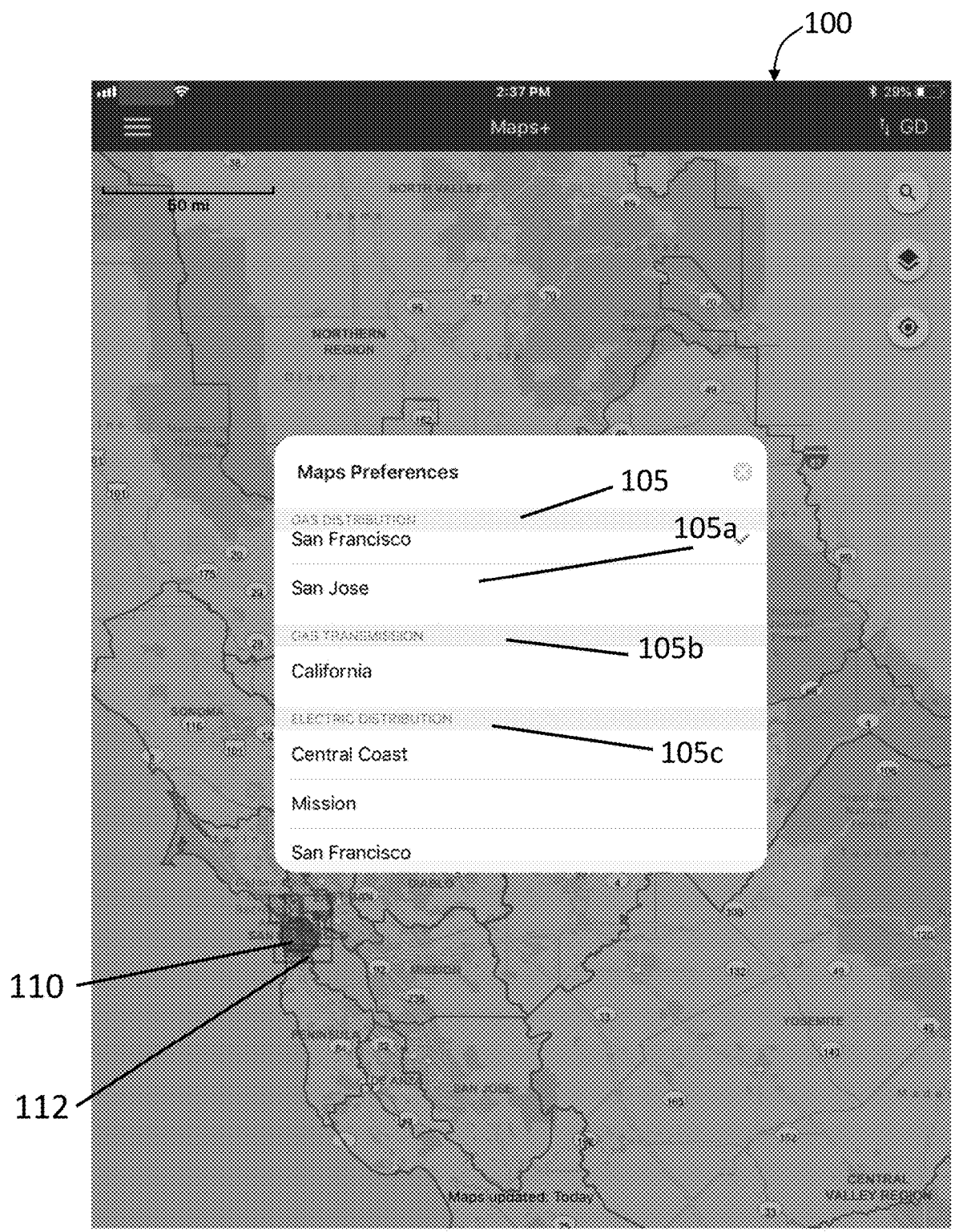
FIG. 1 illustrates an example of a resource map including a map references page in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily-apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Embodiments of the invention herein generally described non-conventional approaches for resource mapping using systems and methods that are not well-known, and further are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and method described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resource and asset or infrastructure data for a user in a way that cannot effectively be done manually. Therefore, the person of ordinary skill can easily recognize that these functions provide the automated functionality, as described herein, in a manner that is not well-known and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

As used herein, a "user" can be a single user or a plurality of users using or engaging a resource mapping platform. Further, a user can be defined as a member of the public, and/or the creator, and/or a consumer, and/or a customer, and/or a client, or an entity such as a limited liability company. Other user types can include, but not be limited to, an administrative user and/or a system user. The user can comprise a mobile user engaging the platform. In some embodiments, the user can couple to a network using any mobile computing device that can be wirelessly coupled to the internet, including, but not limited to, personal digital assistants, and/or cellular phones, mobile phones, or smart phones, and/or pagers, and/or digital tablets, and/or fixed or mobile internet appliances. In some embodiments, one or more components of the network can include numerous user devices which can be personal computers including for example desktop computers, laptop computers, digital assistants, personal digital assistants, cellular phones, mobile phones, smart phones, pagers, digital tablets, internet appliances, vehicular displays, wearable displays, and other processor-based devices. As will be discussed in further detail below, in other embodiments of the invention, one or more components of the network can include numerous user devices that include virtual reality viewing devices such as virtual reality headsets, virtual reality glasses, and the like. In some embodiments, any of the coupled devices or systems can communicate resource data and information from or to another coupled device or system using at least one application or application programming interface (API).

Some embodiments of the invention include a computing device or server that can perform operations comprising displaying at least a portion of at least one map in a graphical user interface (GUI) based at least in part on data or information from one or more mapping components. Some embodiments further comprise displaying a user-selectable or adjustable menu, field, and/or toggle. In some embodiments, the map can include a display of at least one virtual or actual resource, asset, and/or infrastructure. As used herein, an asset can include infrastructure and/or infrastructure can be an asset. Further, an asset (e.g., such as a resource asset) may include or be supported by infrastructure. For example, a gas pipeline carrying a resource such as natural gas can be considered infrastructure of an asset, where the gas pipeline and any associated infrastructure can also be considered as part of the asset.

Some embodiments of the invention include a resource mapping system comprising a computing device including at least one processor, and at least one non-transitory computer readable medium, having stored thereon, instructions that when executed by the at least one processor, cause the computing device to perform operations including retrieving location information of a user using any conventional methods (e.g., such as by using global positioning system (GPS) data, cellular data, and/or WiFi location data). In some embodiments, GPS position data can be received from at least one user device, and information for at least one map can be retrieved from a mapping component database representing at least one location. In some embodiments, the displayed position of the at least one user represents a physical location area or location of the user and/or user's device. In some further embodiments, the at least one user is positioned, re-positioned or moved based at least in part on the GPS position data or other calculated, measured, and/or estimated location.

In some embodiments, a mapping component of the resource mapping system can be coupled with and can communicate with at least one remote server (e.g., such as a mapping database, resource database, or asset or infrastructure database). In some embodiments, the mapping component can enable the system to process virtual maps, and to store any resource related information within the system architecture of the resource mapping system. In some embodiments of the invention, the system architecture can include and enable interaction and operation of at least one server with a web component including conventional protocols and a database server to enable storage of resource and asset or infrastructure information described earlier.

Some embodiments can include one or more user displays including a rendering of a synthetic or virtual world and a real-world view comprising an augmented reality. For example, some embodiments include a resource map with a view of reality that is modified by one or more computer systems (including any of the computer systems described herein) of the resource mapping system. As a result, some embodiments include one or more technology functions with an enhanced perception of reality, where at least one image is augmented when some visual graphics or texts are superimposed into an actual user view that can enhance the user experience when mapping resources. For example, in some embodiments, the resource mapping system can display one or more resource maps including at least one resource, building, and/or infrastructure including augmented reality as described. In some embodiments of the invention, the augmented reality resource mapping can be displayed on one or more user devices such as one or more user smart phones, tablets computers, one or more vehicle displays such as head-up displays and/or in-dash displays, eye wear or other head-mounted displays, watch displays, and other wearable computer systems.

In some embodiments, a user display can include 3D building, structure, resource or asset geometry projected within various graphics platforms including Google Street View™ mapping service. In some embodiments, the display can include real-time data information within a Google Street View™ mapping service. Some embodiments further provide for direct export of a 3D models from a geodatabase (e.g., such as an Esri® geodatabase). Esri® is a registered trademark of Environmental Systems Research Institute, Inc. Google, the Google logo, and Google Street View™ are registered trademarks of Google Inc.

In some embodiments, the resource mapping system can generate and display a resource map (e.g., covering at least a portion of one or more asset or infrastructure service areas) on a display, such as a GUI embodied in at least one user device. For example, FIG. 1 shows an example of a resource map 100 including a map references page 105 displayed overlaid on the resource map 100 in accordance with some embodiments of the invention. In some embodiments, the resource map 100 can include one or more identifiers or components of an active division. For example, some embodiments include a map of a region or area 110 including one or more active divisions 112 depicted graphically on a resource map. In some embodiments, a user can select an active division to enable the resource mapping system to selectively display one or more assets. For example, some embodiments enable the display of assets as a function of gas distribution assets 105*a*, gas transmission assets 105*b*, and/or electrical distribution assets 105*c*.

In some embodiments, the resource mapping system can determine that one (or more) assets is out-of-date. For example, in some embodiments, the resource mapping system can display an out-of-date icon, graphic, or window informing a user that at least a portion of the asset data is out of date. In some embodiments, a prompt can communicate an asset status to the user. In some further embodiments, the resource mapping system can alert the user to a low battery condition using, for example, a low battery indicator or icon, or other display type. I In some embodiments, the resource mapping system can use an operating system battery status to enable or disable functionality to protect the data integrity of the application. For example, in some embodiments, after a low battery status is detected, a Microsoft® DeltaSync communications protocol or map downloads can be disabled to prevent the operating system from disrupting the download mechanism and possibly causing data integrity issues (e.g., data corruption).

In some embodiments, the resource mapping system can display a search window where one or more search parameters can be entered by a user. In some embodiments, the search parameter can include an operating number of an asset such as a primary meter, a transformer, a switch, etc.

Some embodiments include a display of an activity log. For example, in some embodiments, the activity of one or more users can be displayed on one or more user displays. In some embodiments, the log can comprise a date and time of one or more activities of one or more users.

Figure 2:
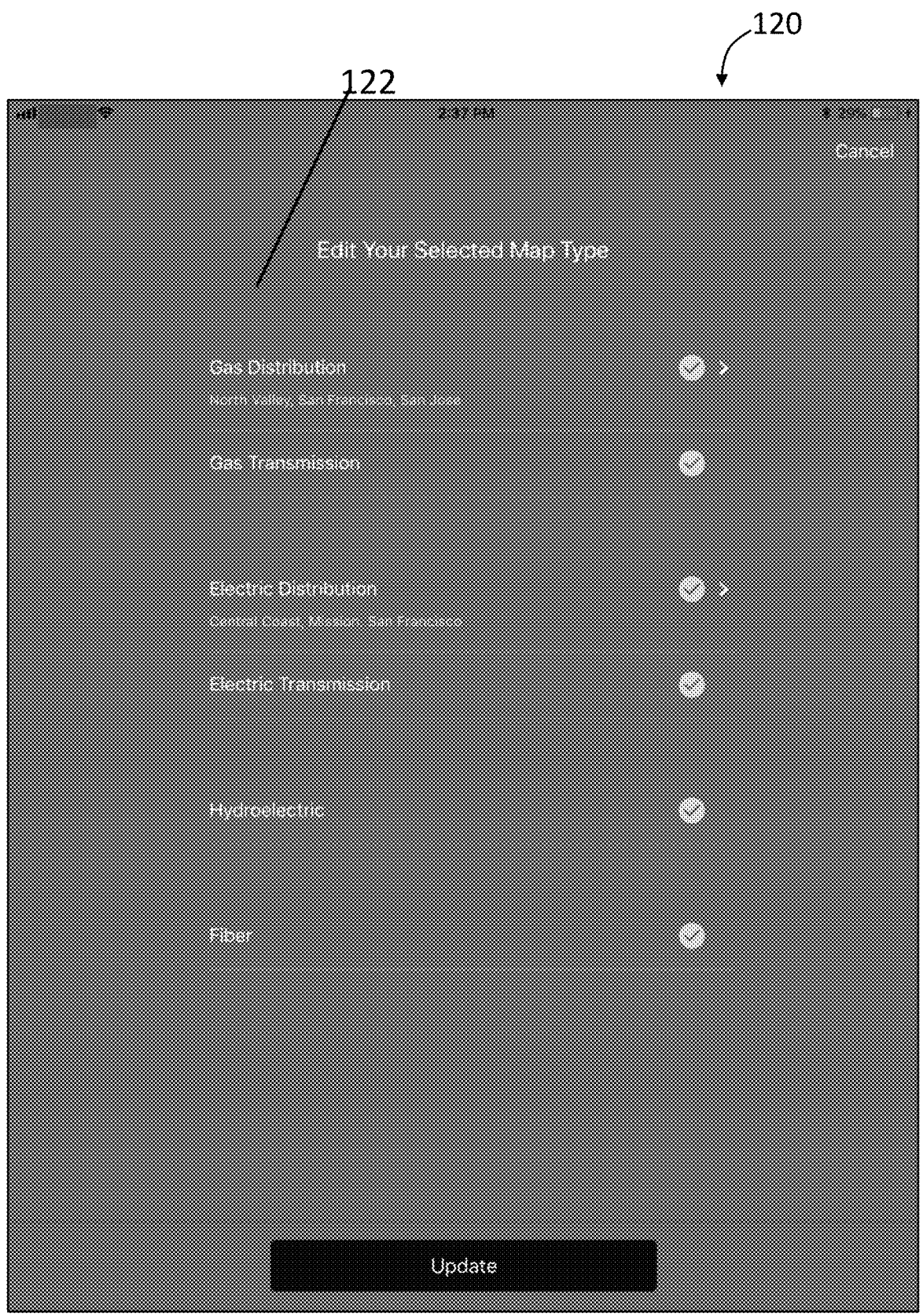
FIG. 2 illustrates a display of a map manager tool page in accordance with some embodiments of the invention.

In some embodiments, the resource mapping system can comprise program logic enabling a map manager that can be used to select or define a map type based on one or more assets, infrastructure, or a service provided. For example, FIG. 2 illustrates a display of a map manager tool page 120 in accordance with some embodiments of the invention. In some embodiments, a menu 122 of the map manager tool page 120 can be used to select a gas distribution map type, and/or a gas transmission map type, and/or an electrical distribution map type, and/or an electrical transmission map type, and/or a hydroelectric map type, and/or a fiber map type. In some embodiments, a user's selection of the gas distribution map type, a gas transmission map type, an electrical distribution map type, an electrical transmission map type, a hydroelectric map type, and/or a fiber map type can enable a user to also select a desired division (e.g., such as a central coast, De Anza, Diablo, East Bay, Fresno, or other geographic area of an asset) for display as at least a portion of a displayed map.

Figure 3:
FIG. 3 shows a display of a resource map representing a redirecting to current location in accordance with some embodiments of the invention.

In some embodiments, the resource mapping system can access a user's location. In some embodiments, the resource mapping system can prompt a user to allow the resource mapping system to access the user's location. For example, in some embodiments, the resource mapping system can display an access allowance window overlaid on the resource map including an allow or don't allow selection. In some embodiments, the resource mapping system can display a map that is displayed based on the user's location. For example, FIG. 3 shows a display 140 of a resource map 142 representing a redirecting to current location in accordance with some embodiments of the invention. In some embodiments, a user can drop a pin at the user's location 144 and/or at an asset location 146a, 146b, and/or at any specific map location, and manipulate the view of map based on the pin as a fixed location.

Figure 4:
FIG. 4 is a display of a resource map including a toggle of an active division in accordance with some embodiments of the invention.
Figure 5:
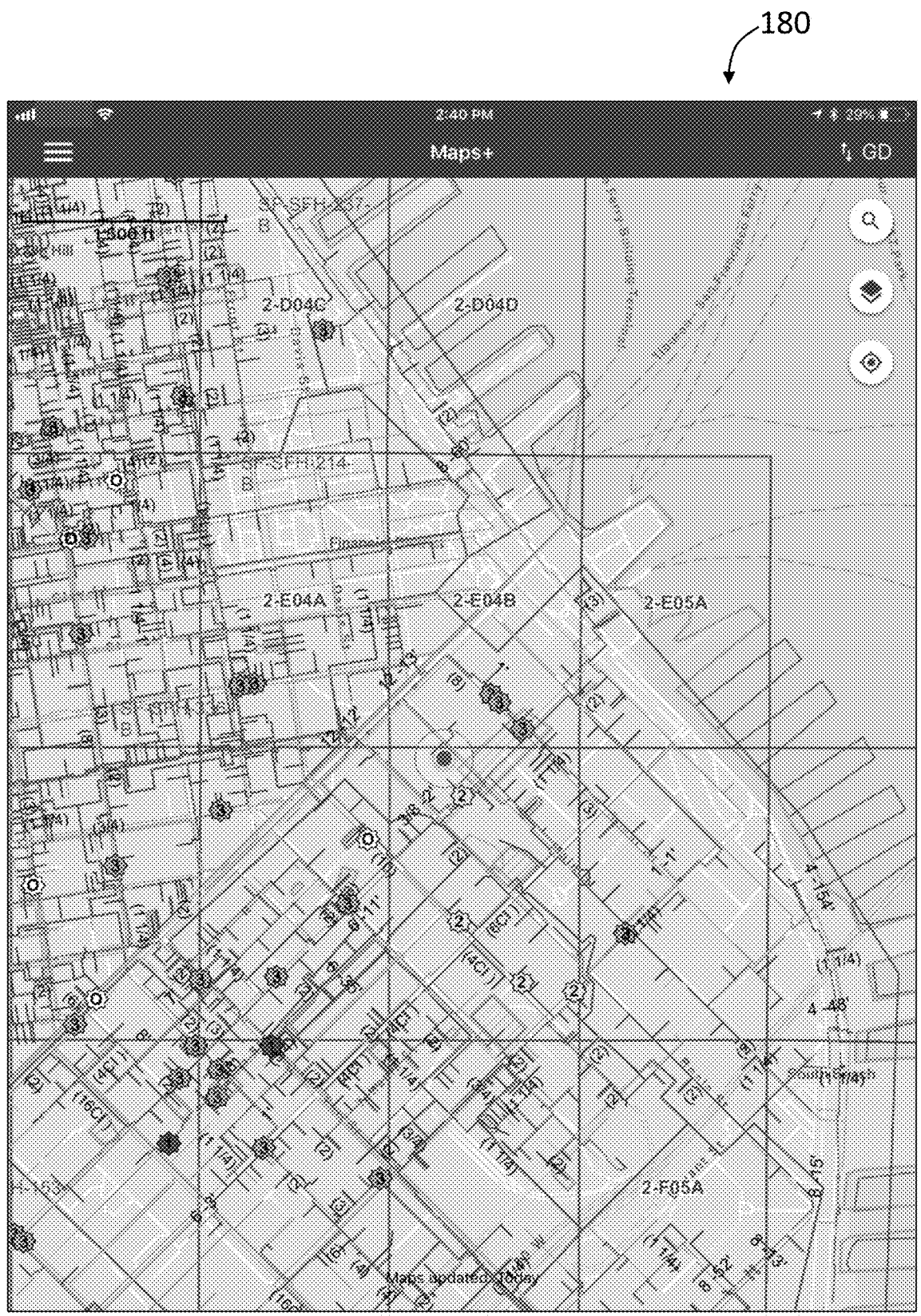
FIG. 5 is a display of a resource map including a toggle of an active division in accordance with some embodiments of the invention.
Figures 6A, 6B:
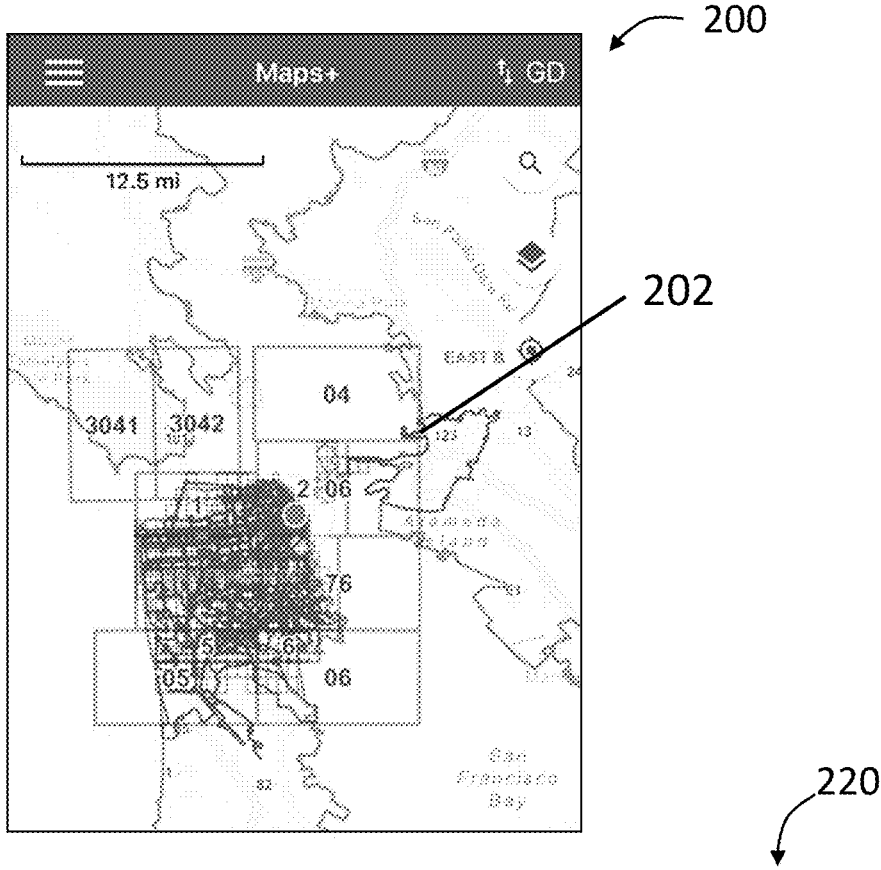
FIGS. 6A-6B, and 7A-7B show resource maps with selected assets distribution and transmission in accordance with some embodiments of the invention.
Figure 7A:
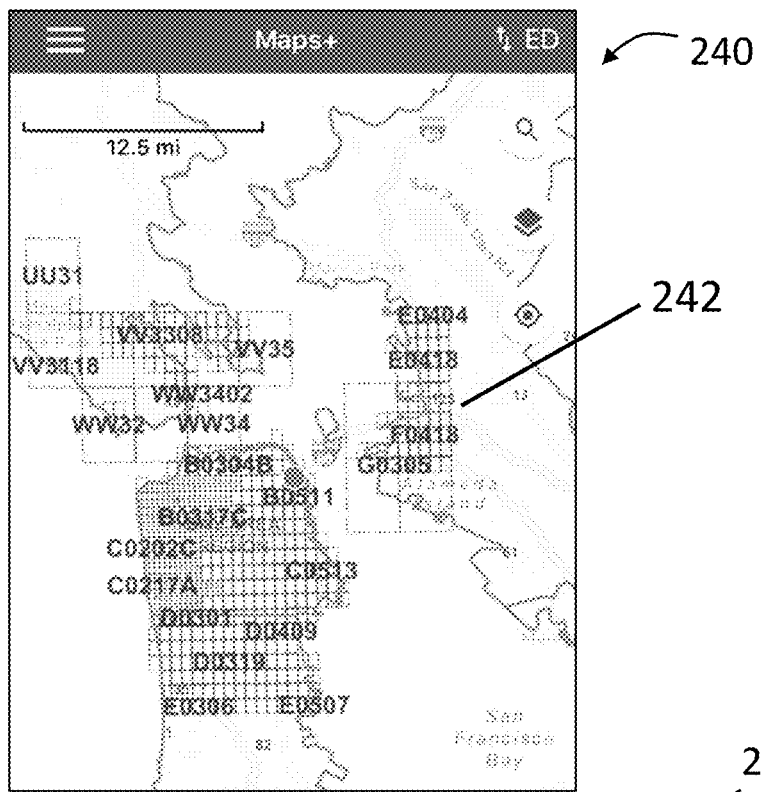
Figure 7B:
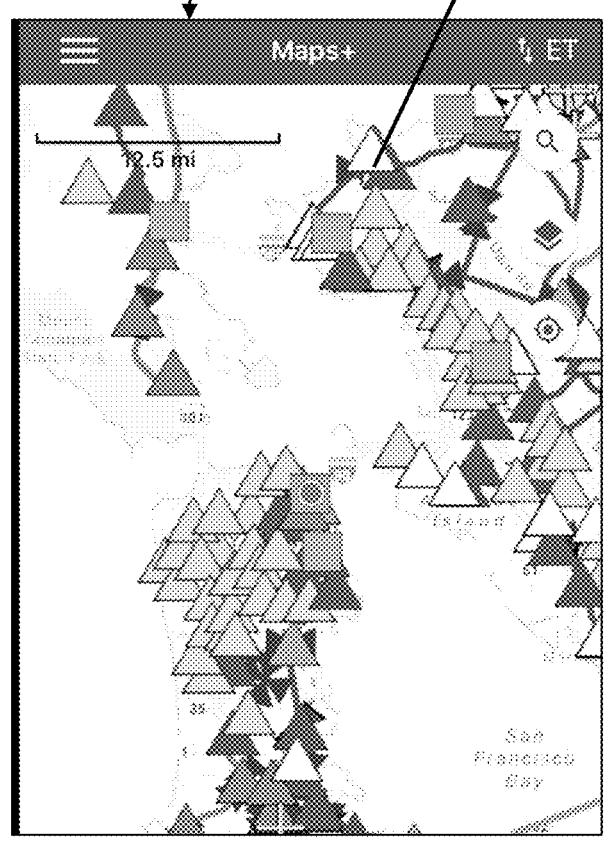

In some embodiments, an active division can be prominently displayed on the resource map. Referring to FIGS. 4 and 5 including displays of a resource map 160, 180 including a toggle of one or more active divisions 161a, 161b, 161c, in some embodiments, any one or more of the regions 165 can be highlighted or otherwise identified as an active division. In reference to FIGS. 6A-6B, and 7A-7B, in some embodiments, the user can toggle between maps showing asset distribution and transmission assets. For example, FIG. 6A shows a resource map 200 with gas distribution, FIG. 6B shows a resource map 220 with gas transmission 222, FIG. 7A shows a map 240 with electrical distribution 242, and FIG. 7B shows a resource map with electrical transmission 262.

Figure 8:
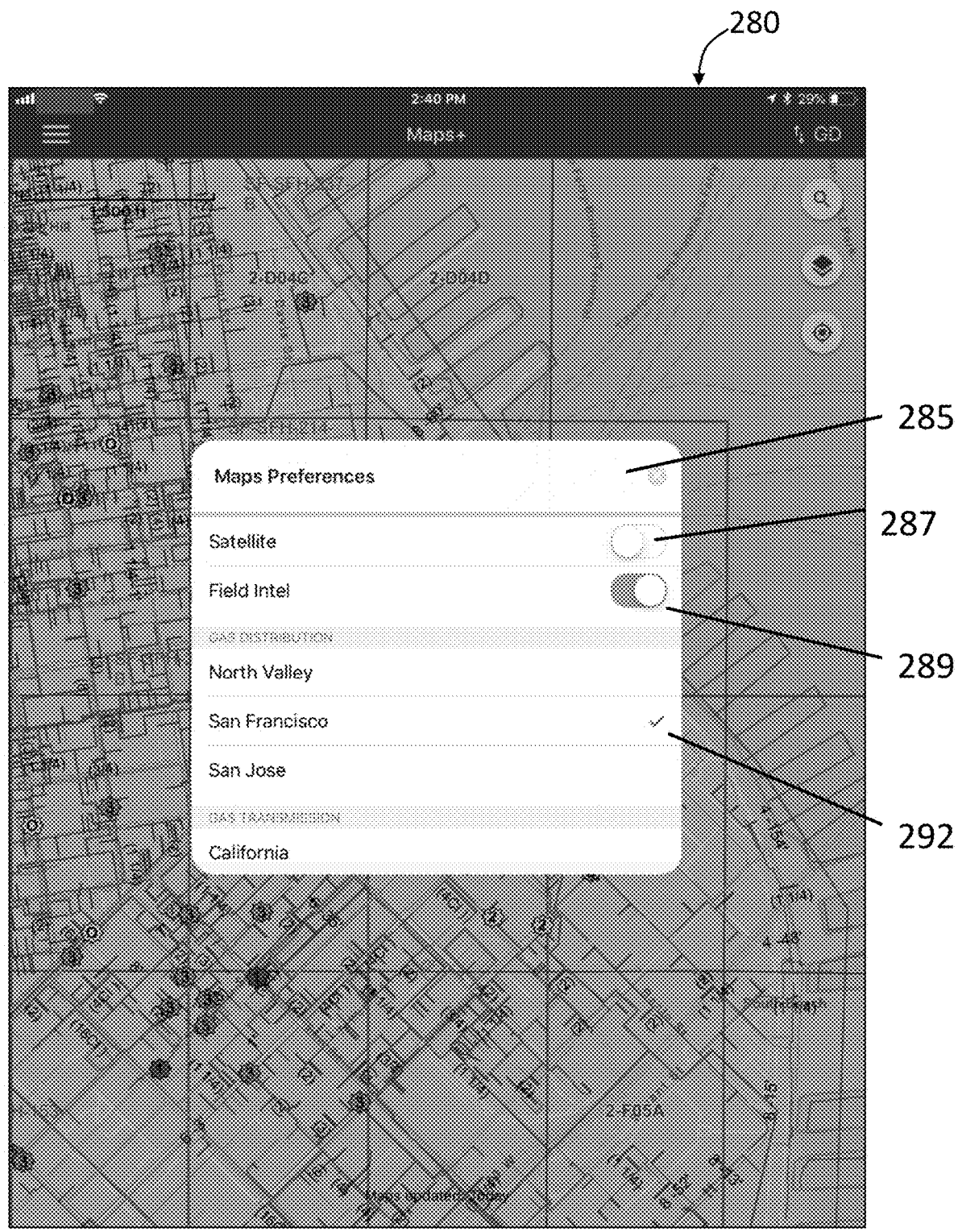
FIGS. 8-10 show displays of a resource map with a map preferences tool in accordance with some embodiments of the invention.
Figure 9:
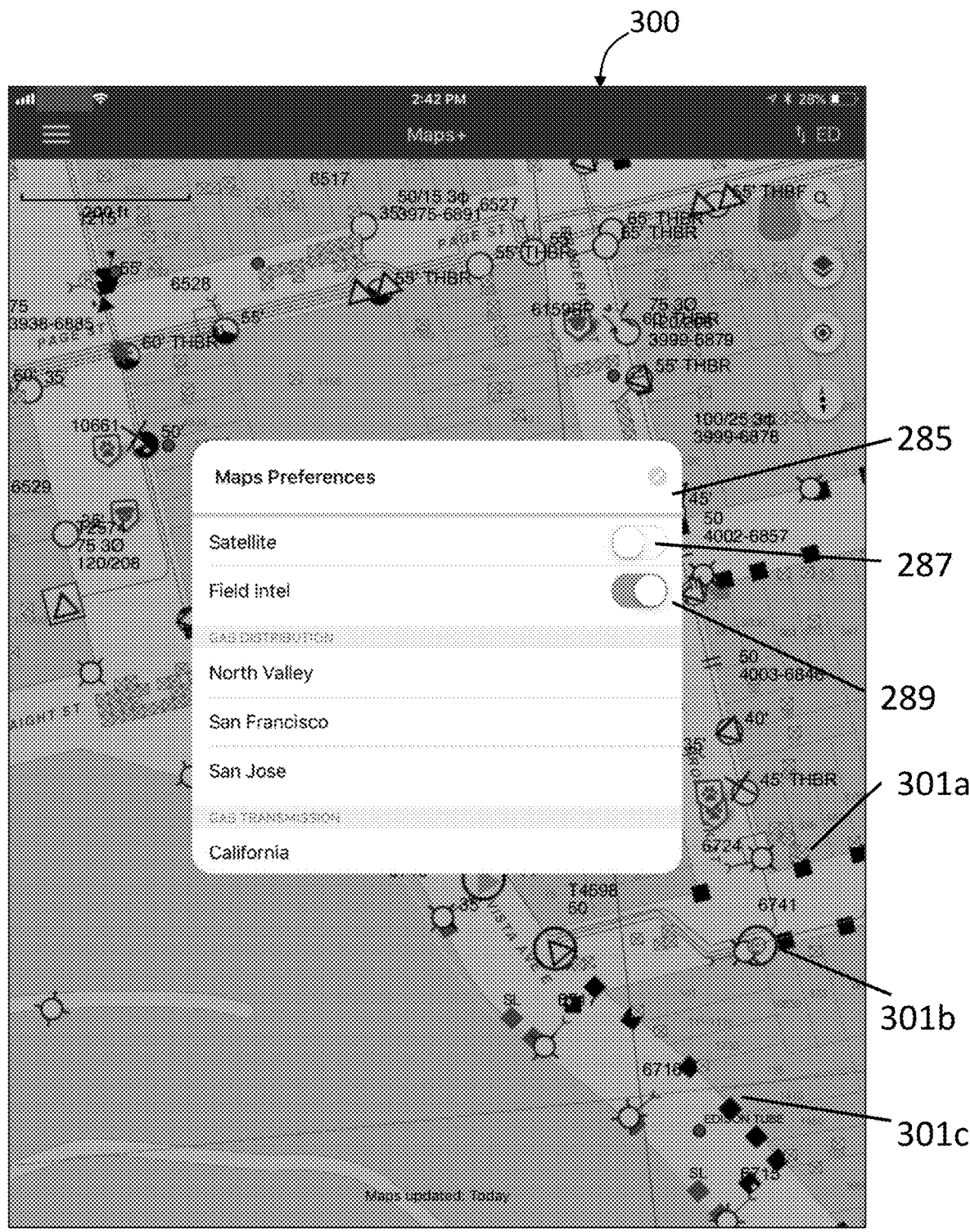
Figure 10:
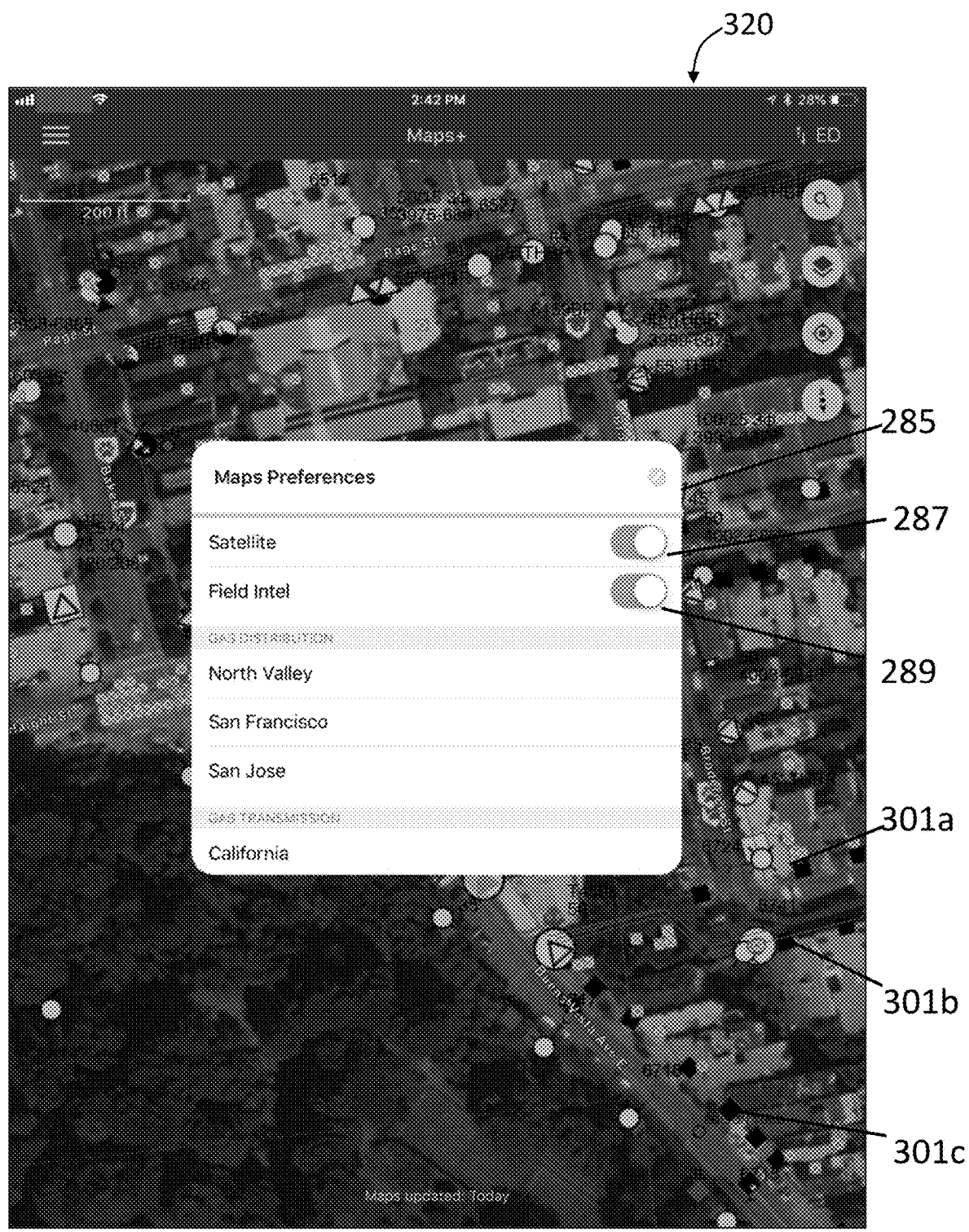

FIGS. 8-10 show displays of resource maps 280, 300, 320, each with an overlaid map preferences tool 285 in accordance with some embodiments of the invention. In some embodiments, the resource maps 280, 300, 320 can be toggled to enable a user to view a map with and without a satellite view. For example, resource maps 280, 300 show the satellite toggle 287 in an off position and the resource map 280 is displayed without a satellite view or satellite overlay. The resource map 320 of FIG. 10 is shown with a satellite view or overlay, and the satellite toggle 287 is shown in an on or selected position. Further, as illustrated in FIGS. 9 and 10, in some embodiments, a field intelligence toggle 289 can be used to toggle assets and asset information on a selective basis. For example, in some embodiments, the field intelligence can be selected based on a city and/or region, and/or an asset or resource such as a gas distribution or gas transmission asset. In some embodiments, the toggled assets and asset information can be expanded based on the status of the assets, the use of the assets, the response of the assets to an environmental factor such as an earthquake, wildfire, or other natural or human-made phenomenon. In the non-limiting example embodiment of FIGS. 9 and 10, a selection of the toggle assets 301a, 301b, 301c are shown marked.

Figure 11:
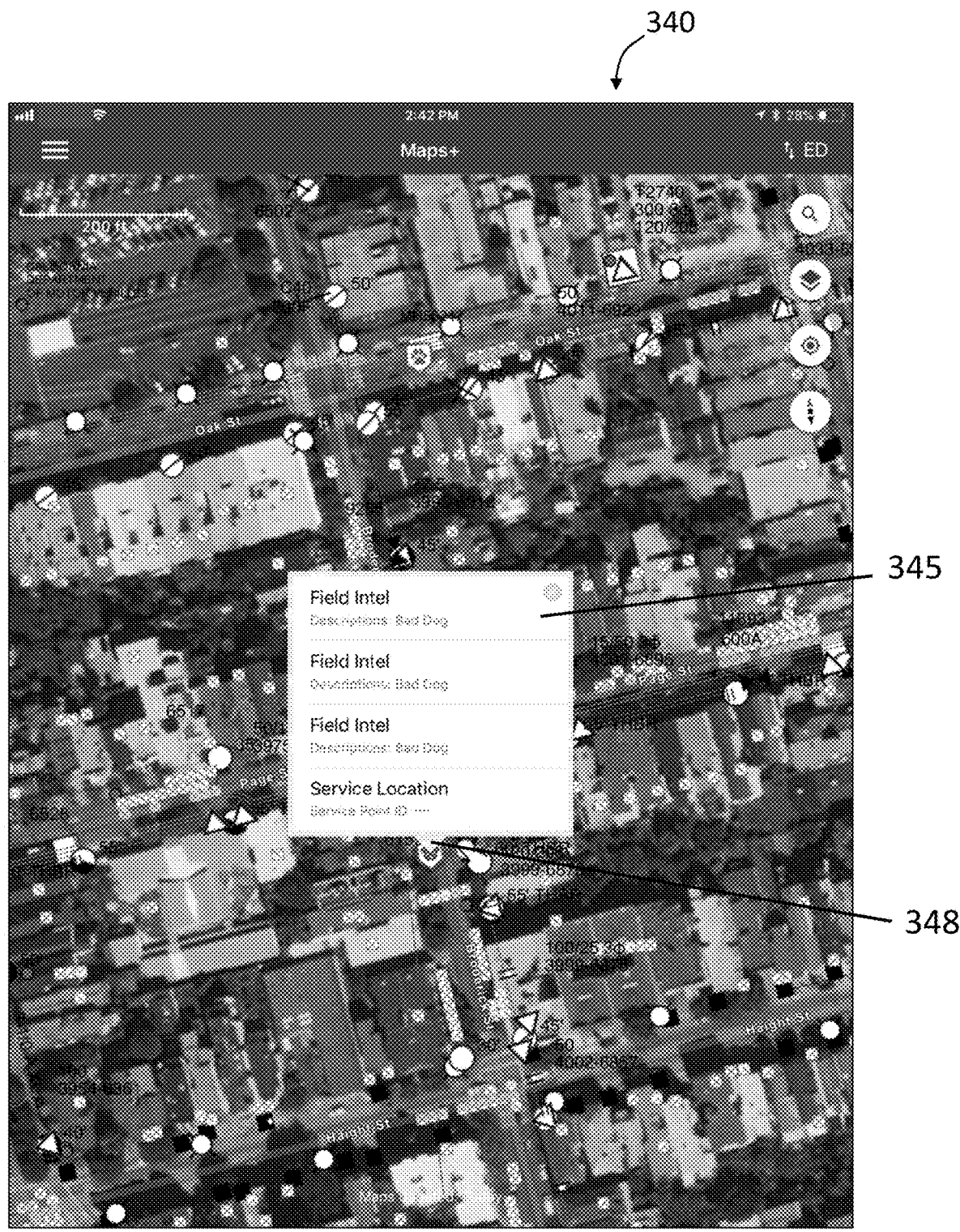
FIG. 11 is a display of a field intelligence window in accordance with some embodiments of the invention.

Some embodiments enable the display of field intelligence information including a graphical location of one or more assets and a detailed description of the assets. For example, FIG. 11 is a display of a field intelligence window 345 displayed or overlaid on a map 340 in accordance with some embodiments of the invention. In the non-limiting embodiment of FIG. 11, the field intelligence window 345 includes a location, tracking, and/or monitoring of a specific asset known as an aggressive (also referred to as "bad") dog 348. In some embodiments, the intelligence window 345 can include a list or description of the specific asset, and/or other specific assets within the map 340.

Figure 12:
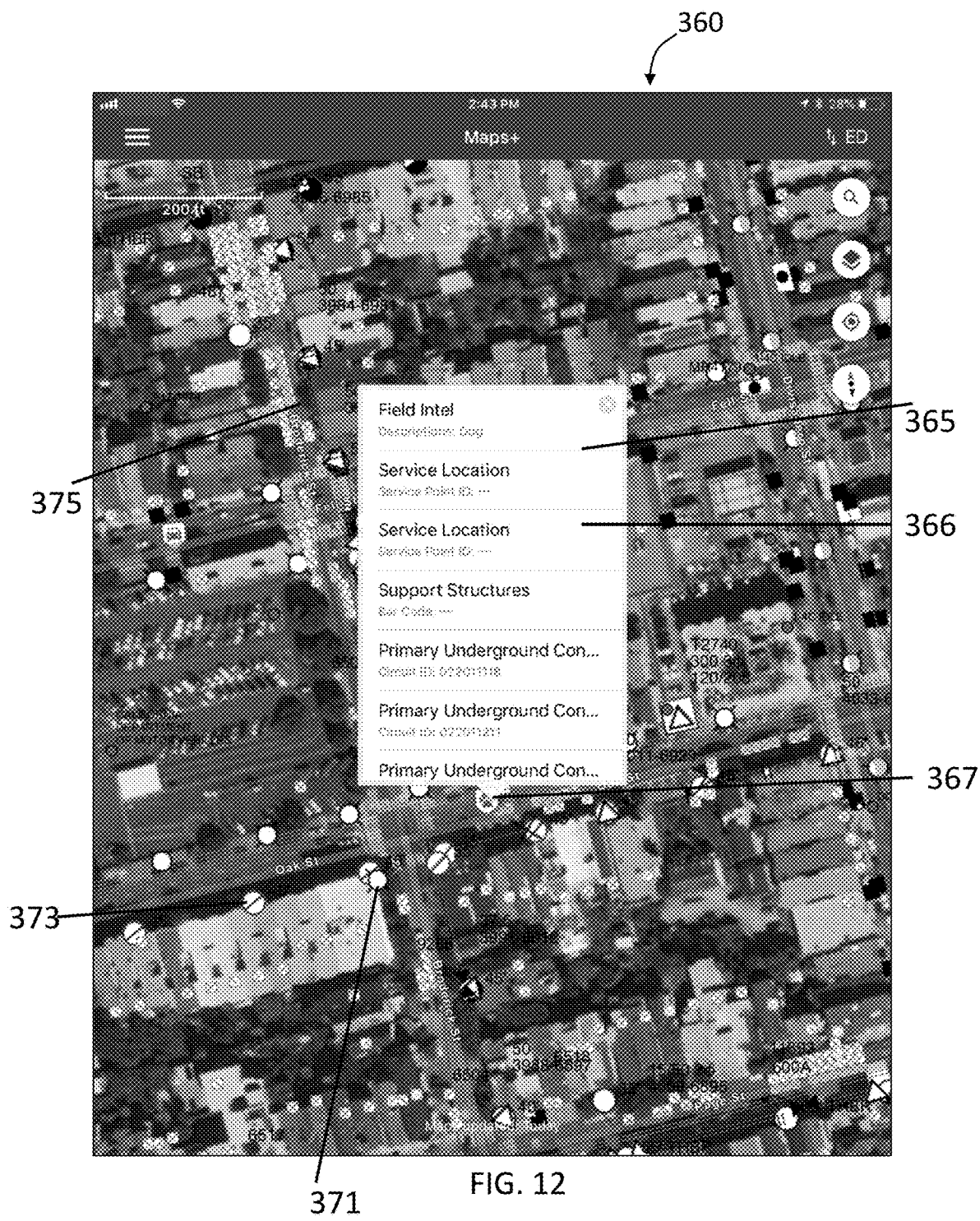
FIG. 12 is a display of a resource map with satellite mode turned on with a map references tool including a field intelligence window in accordance with some embodiments of the invention.

Further, FIG. 12 is a display of a resource map 360 with satellite mode on with map references tool with field intelligence window 365 in accordance with some embodiments of the invention. In some embodiments, the resource map 360 can identify resource assets as one or more graphics or icons 371, 373, 375 based on the location of the assets. Further, as shown, field intelligence information 366 (e.g., such as a bad dog 367 at a location) can be displayed within field intelligence window 365 including service location, support structures, underground assets (i.e., those that would not be visible on a satellite map).

Figure 13:
FIG. 13 is a display of a resource map with satellite mode turned on with a map references tool with field intelligence window in accordance with some embodiments of the invention.

FIG. 13 is a display of a resource map 380 with satellite mode on showing a map references tool with field intelligence window 385 in accordance with some embodiments of the invention. In this instance, the resource map 380 can include field intelligence comprising a traffic issue 387. In some other embodiments, other identifiable field intelligence information can include local or near-local environmental conditions such as a wildfire, earthquake, or any other natural or human-made phenomenon.

Figure 14:
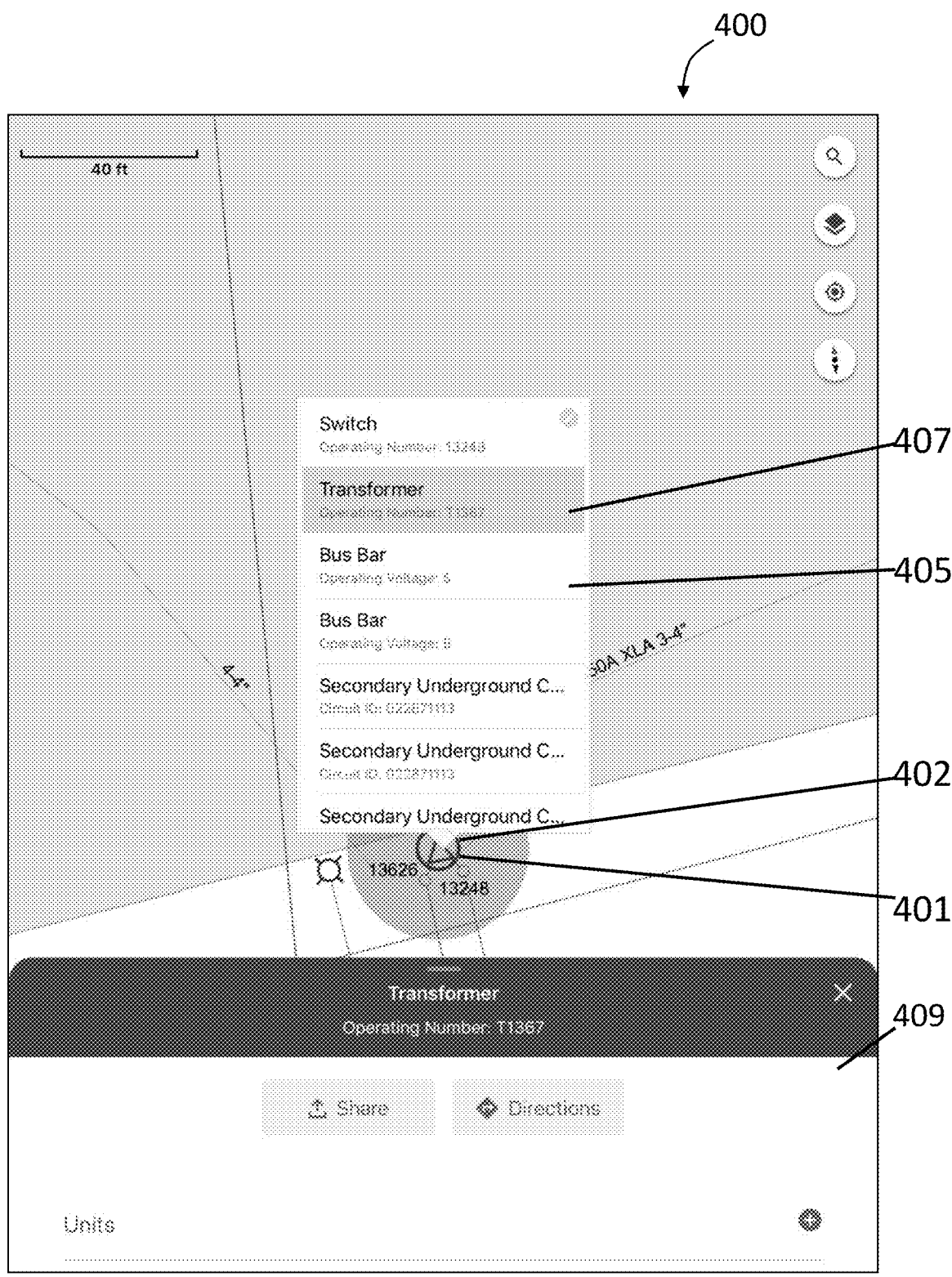
FIG. 14 is a display with a magnified resource map portion including a transformer resource location identifier in accordance with some embodiments of the invention.
Figure 15:
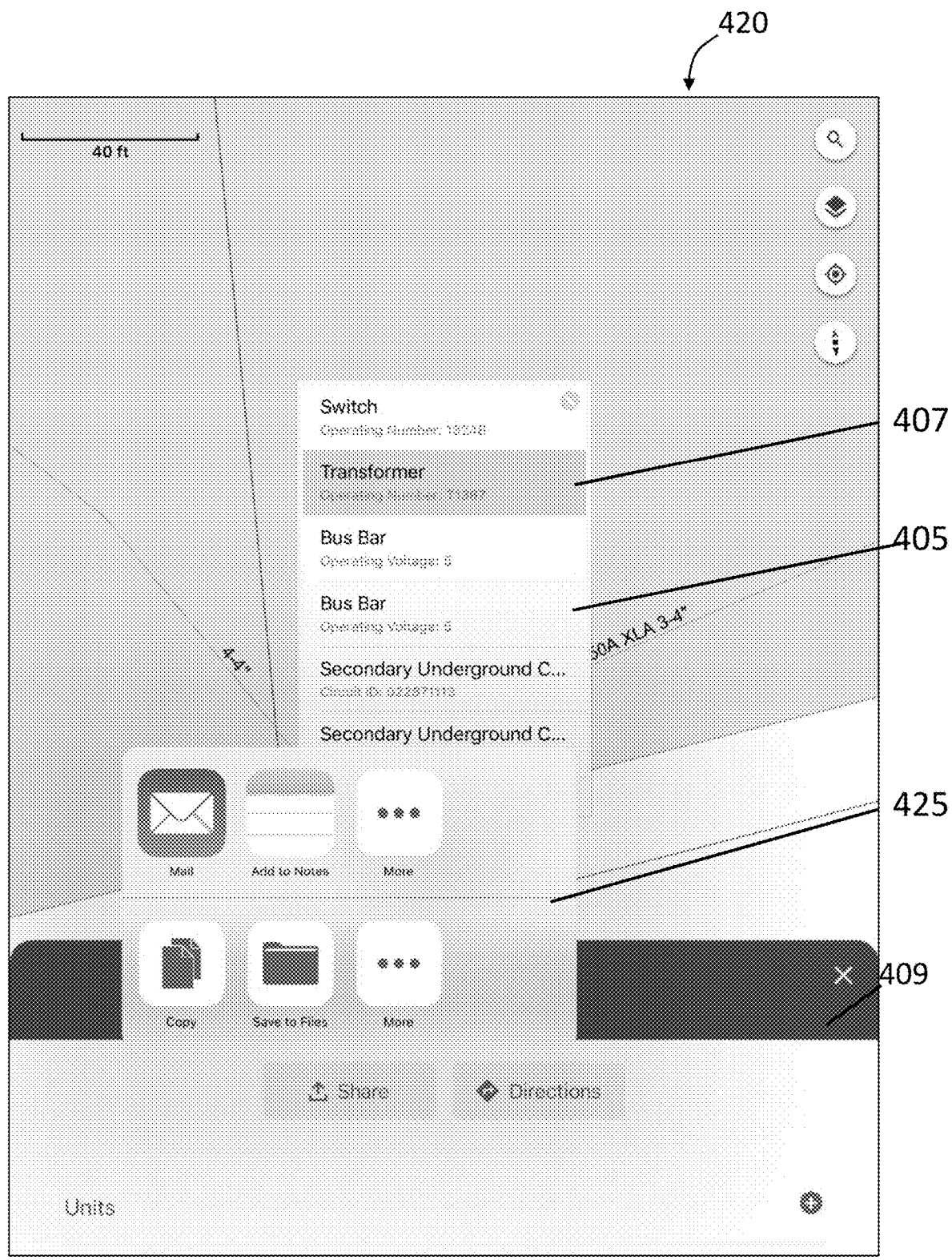
FIG. 15 includes the display of FIG. 14 with a sharing location function in accordance with some embodiments of the invention.
Figure 16:
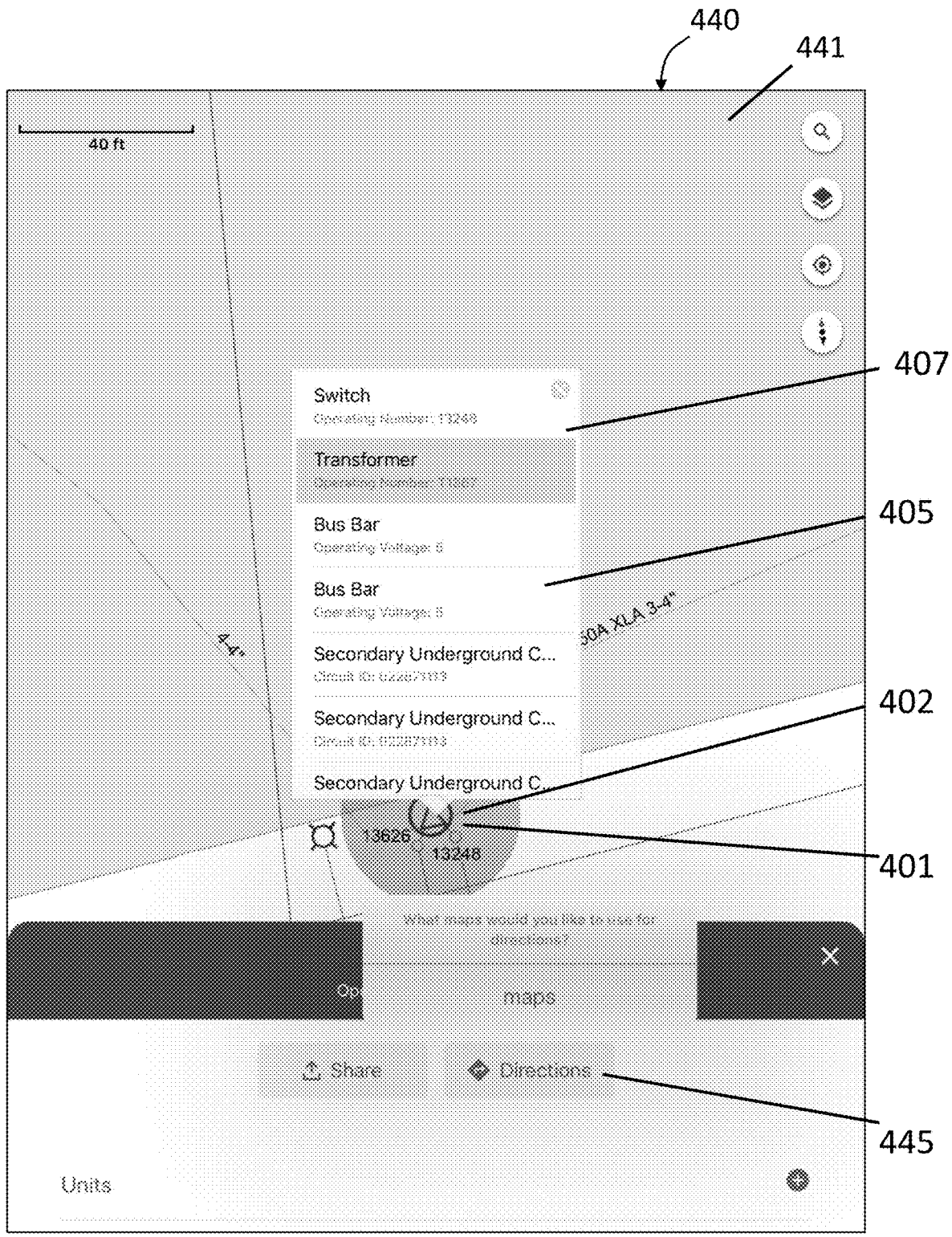
FIG. 16 includes the display of FIG. 14 with direction options function in accordance with some embodiments of the invention.

Some embodiments can enable a user to zoom to a specific asset and examine one or more parameters of the asset. For example, FIG. 14 is a display with a magnified resource map portion 400 including a transformer resource location identifier 402 in accordance with some embodiments of the invention. In this non-limiting example embodiment, a transformer asset 401 is shown including a details window 405 comprising parameters, operating characteristics and/or associated assets or structure 407. Furthermore, in some embodiments, further details of the transformer asset 401 (or any other asset selected from the details window 405) can be shown in an asset sub-window 409. Further, FIG. 15 includes the display 420 of FIG. 14 with a sharing location function 425 in accordance with some embodiments of the invention. In this non-limiting example embodiment, the resource mapping system is shown displaying options for communication regarding the assets, adding notes, copying, saving to file, etc., and further including a transformer resource location identifier 402 in accordance with some embodiments of the invention. In this non-limiting example embodiment, a details window 405 is shown with associated assets or structure 407 and asset sub-window 409. In some embodiments, sharing location function 425 can be used to copy, save to files, email, or add notes related to associated assets or structure 407 of the details window 405. Further, FIG. 16 includes the display 440 of FIG. 14 with direction options function 445 in accordance with some embodiments of the invention. In some embodiments, the user can display directions to the asset shown on the resource map 441 using the direction options function 445.

Figure 17:
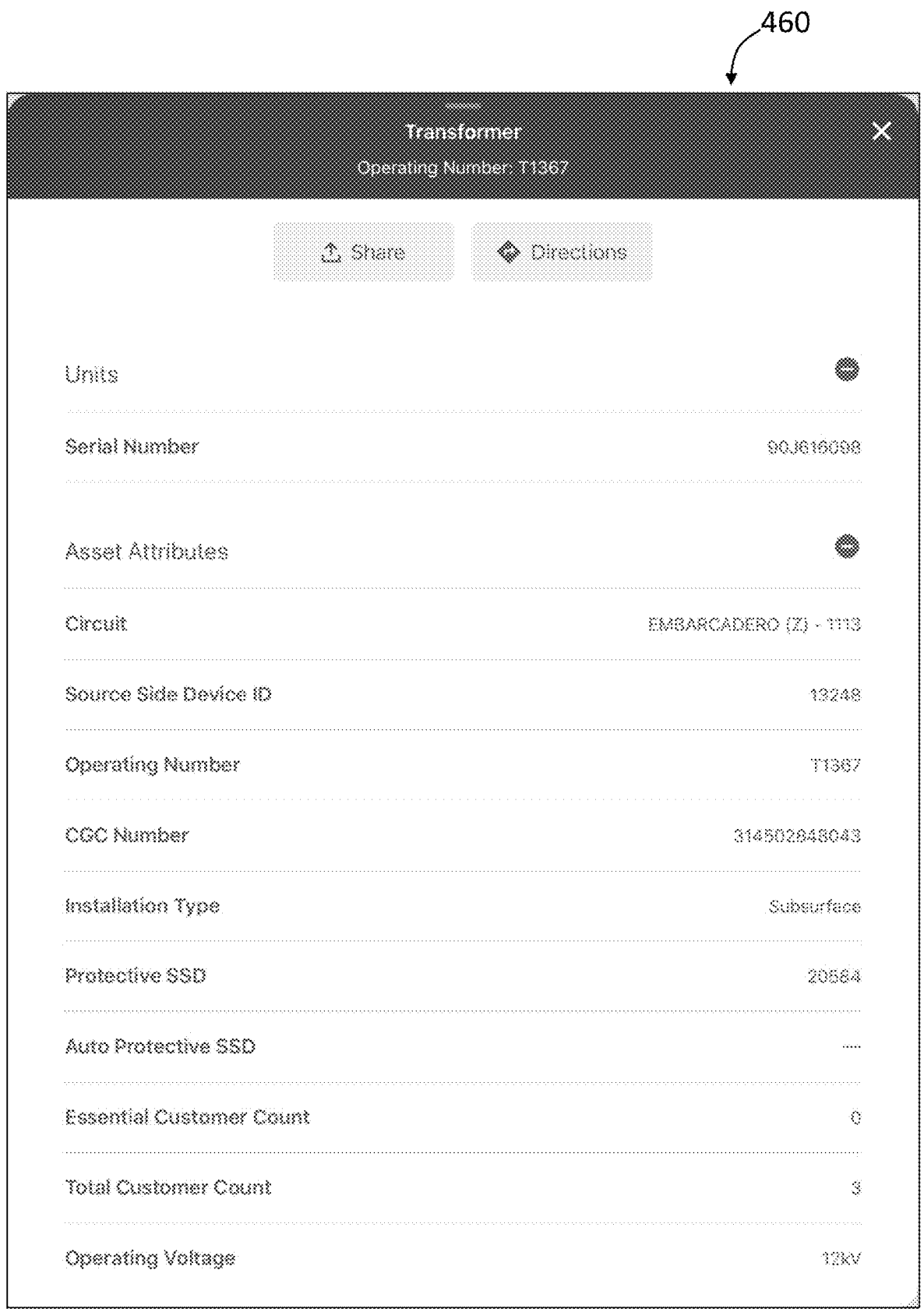
FIG. 17 is a transformer resource attribute viewer in accordance with some embodiments of the invention.

In some embodiments, the resource mapping system can display a window 460 with detailed information or attributes of the asset. For example, FIG. 17 is a transformer resource attribute viewer 460 in accordance with some embodiments of the invention. In some embodiments, the transformer resource attribute viewer 460 can include information or attributes of the asset including, but not limited to, a serial number of an asset, and/or one or more asset attributes such as circuit, source side device ID, operating number, "CGC" number, installation type, protective SSD, essential customer count, total customer count, and/or operating voltage. In some embodiments, the window 460 can include a sharing function 462 that can enable a user to share information from the window 460 and/or share the window 460. In some further embodiments, a directions function 464 can provide directions to an asset of the window 460.

Figure 18:
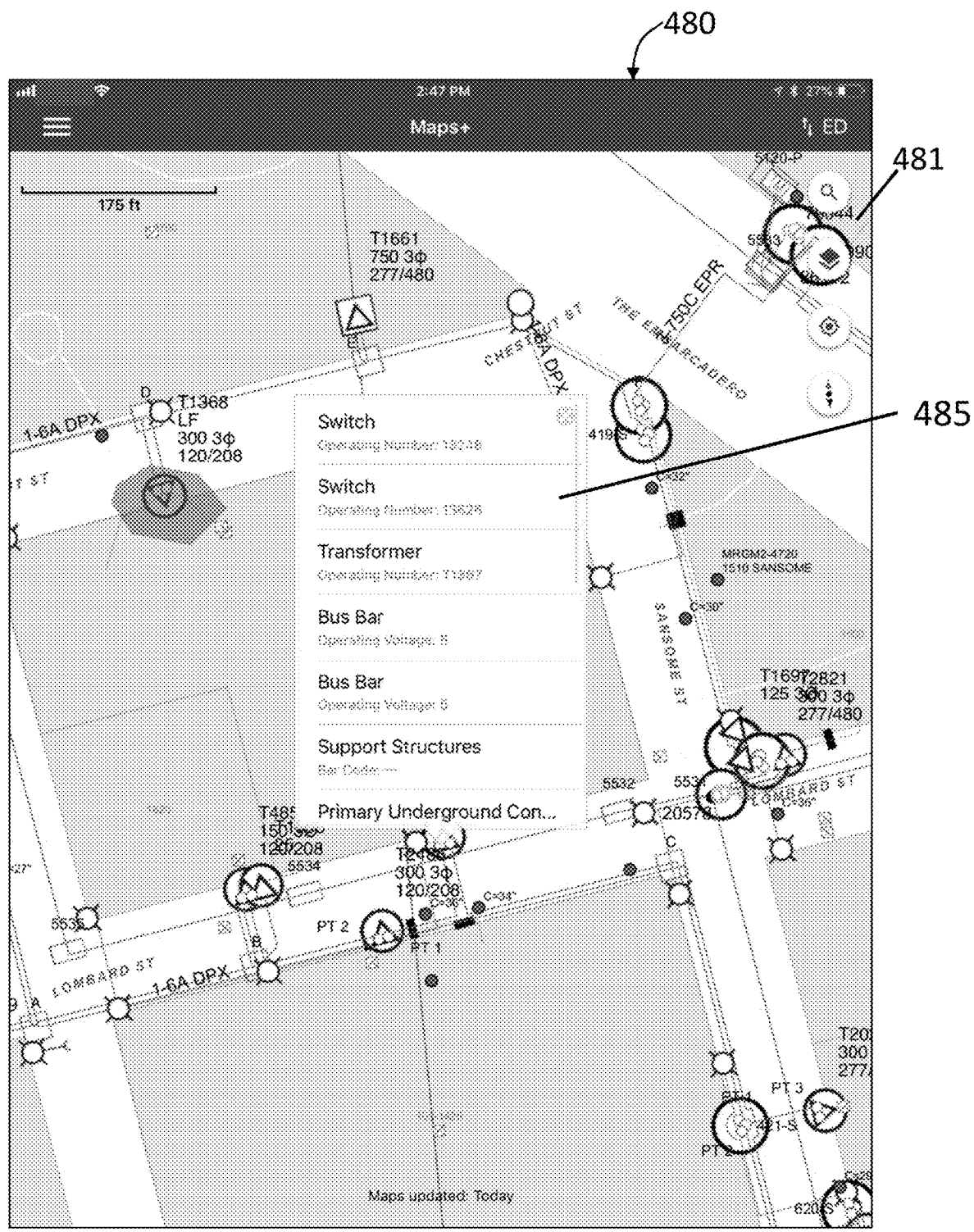
FIG. 18 is a display including a magnified resource map portion with resource and infrastructure identifiers in accordance with some embodiments of the invention.

FIG. 18 is a display 480 including a magnified resource map portion 481 with resource and infrastructure identifiers 485 in accordance with some embodiments of the invention. In some embodiments, the resource mapping system can enable a user to increase the resolution of the map portion 481 and/or zoom into or out of the map portion 481.

Figure 19:
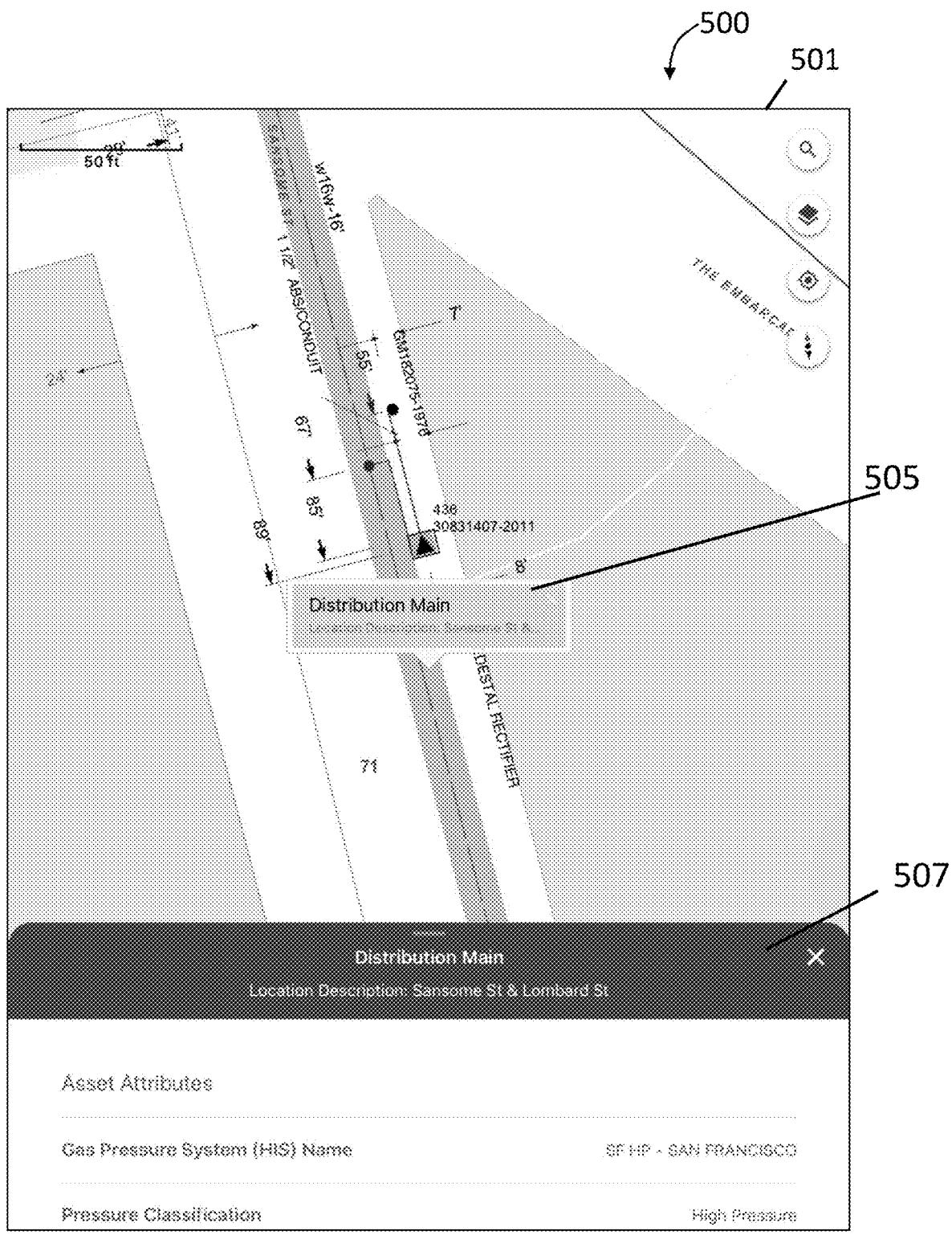
FIG. 19 is a display including a magnified resource map portion highlighting a resource asset in accordance with some embodiments of the invention.
Figure 20:
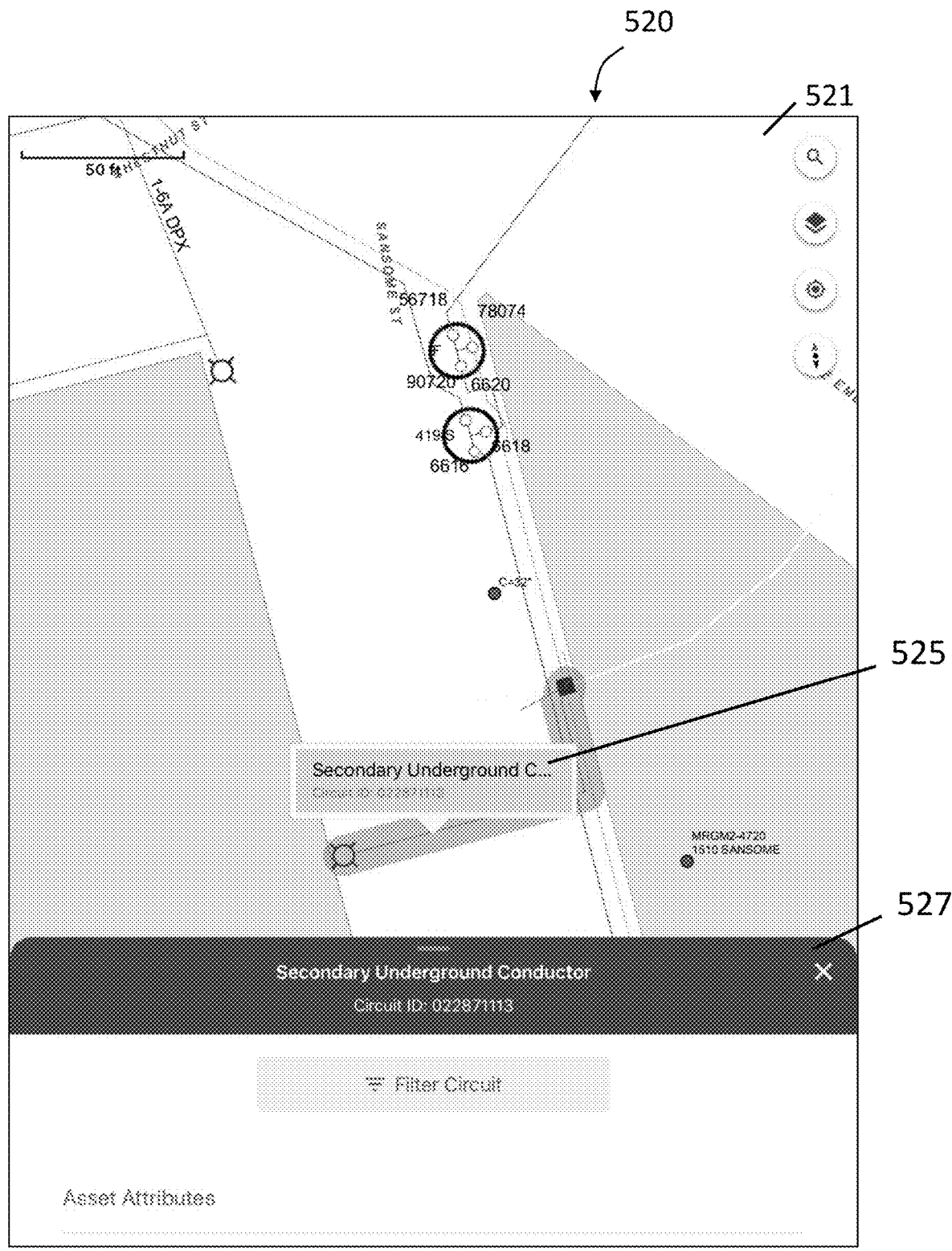
FIG. 20 is a display including a magnified resource map portion with a filter circuit in accordance with some embodiments of the invention.

FIG. 19 is another non-limiting example display 500 including a magnified resource map portion 501 highlighting a resource asset 505 and an information window 507 in accordance with some embodiments of the invention. Further, FIG. 20 is a display 520 including a magnified resource map portion 521 with an identified resource asset 525 in accordance with some embodiments of the invention. In these non-limiting embodiments, the display can include a highlight of the asset and a display of any associated information related to the asset in information window 507, 527.

Figure 21:
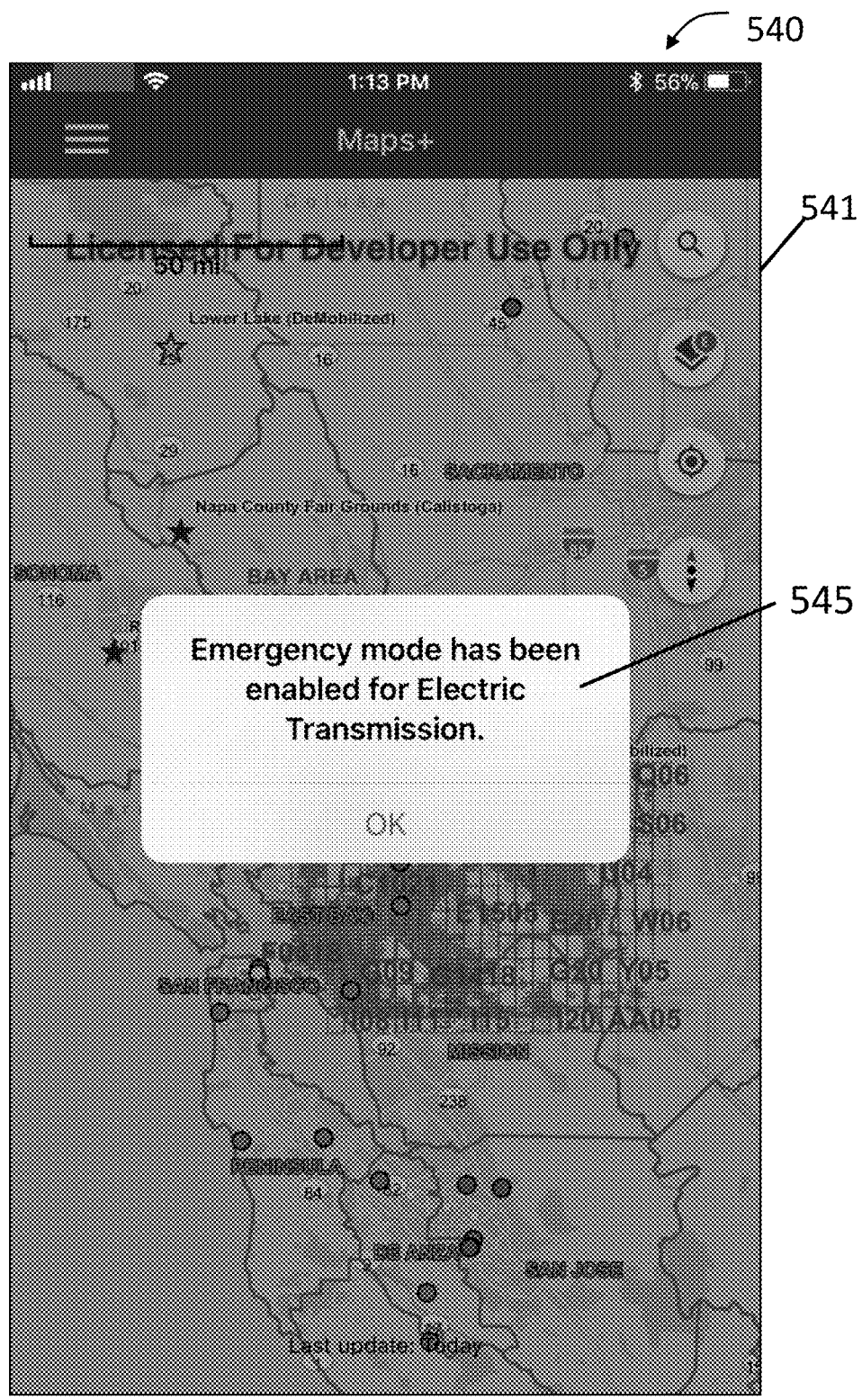
FIG. 21 illustrates a display including a resource map in an emergency mode in accordance with some embodiments of the invention.

Some embodiments of the invention include an emergency mode to provide emergency information in the form of emergency layers on a map view on a mobile device. In some embodiments of the invention, resource mapping system can process a resource map that can be enabled for control, assessment, or analysis of assets in an emergency mode. In some embodiments, this can assist users responding to the fire performing inspection, repairs, etc., and improve overall safety and efficiency of tasks related to the emergency. In some embodiments, the emergency layers can be overlaid on top of the existing asset data layers to make it more meaningful for utility crew. For example, FIG. 21 illustrates a display 540 including a resource map 541 in an emergency mode illustrating an emergency mode alert window 545 in accordance with some embodiments of the invention.

Figure 22:
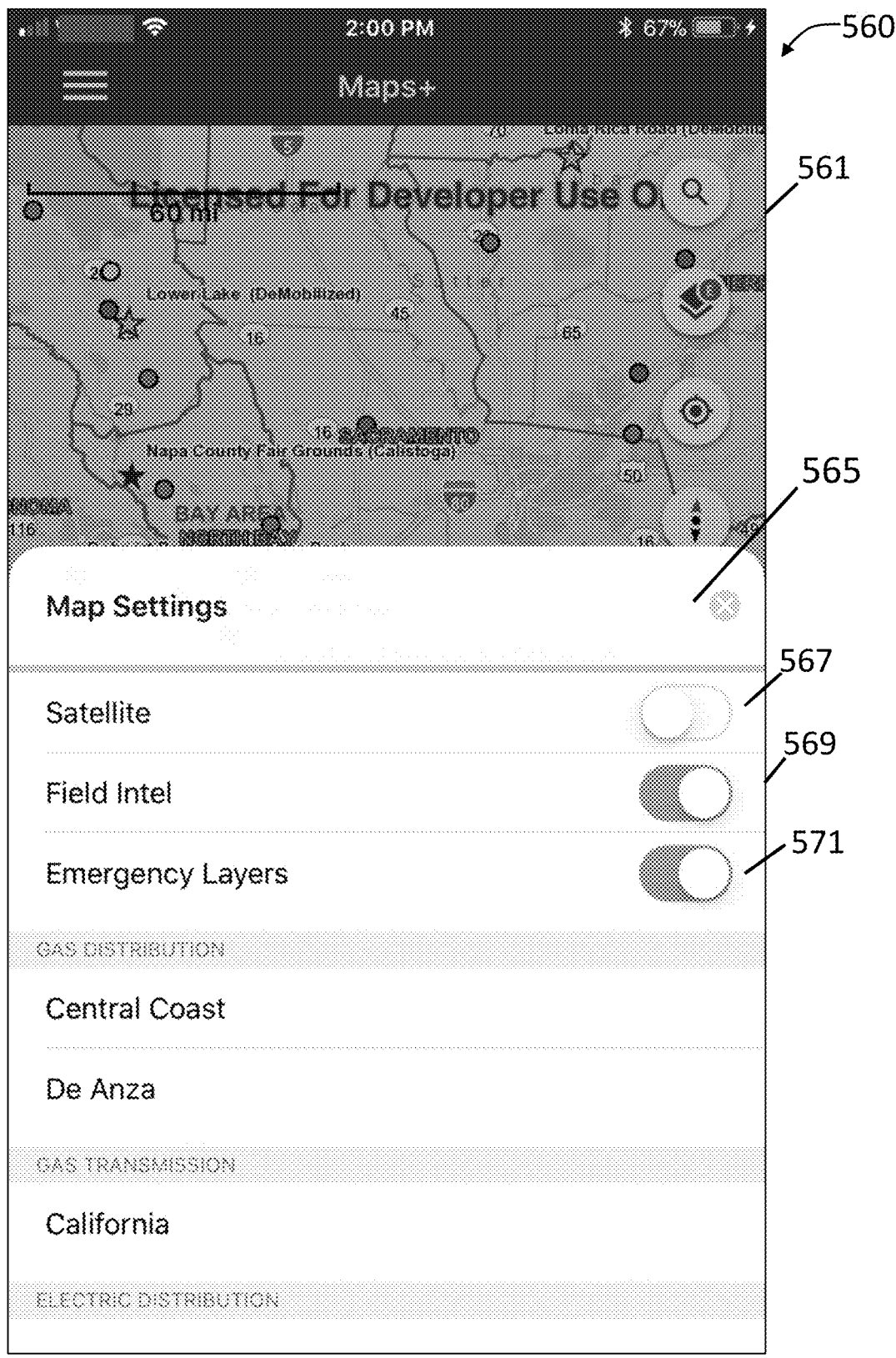
FIG. 22 illustrates a display including a resource map with emergency settings toggle display in accordance with some embodiments of the invention.
Figure 23:
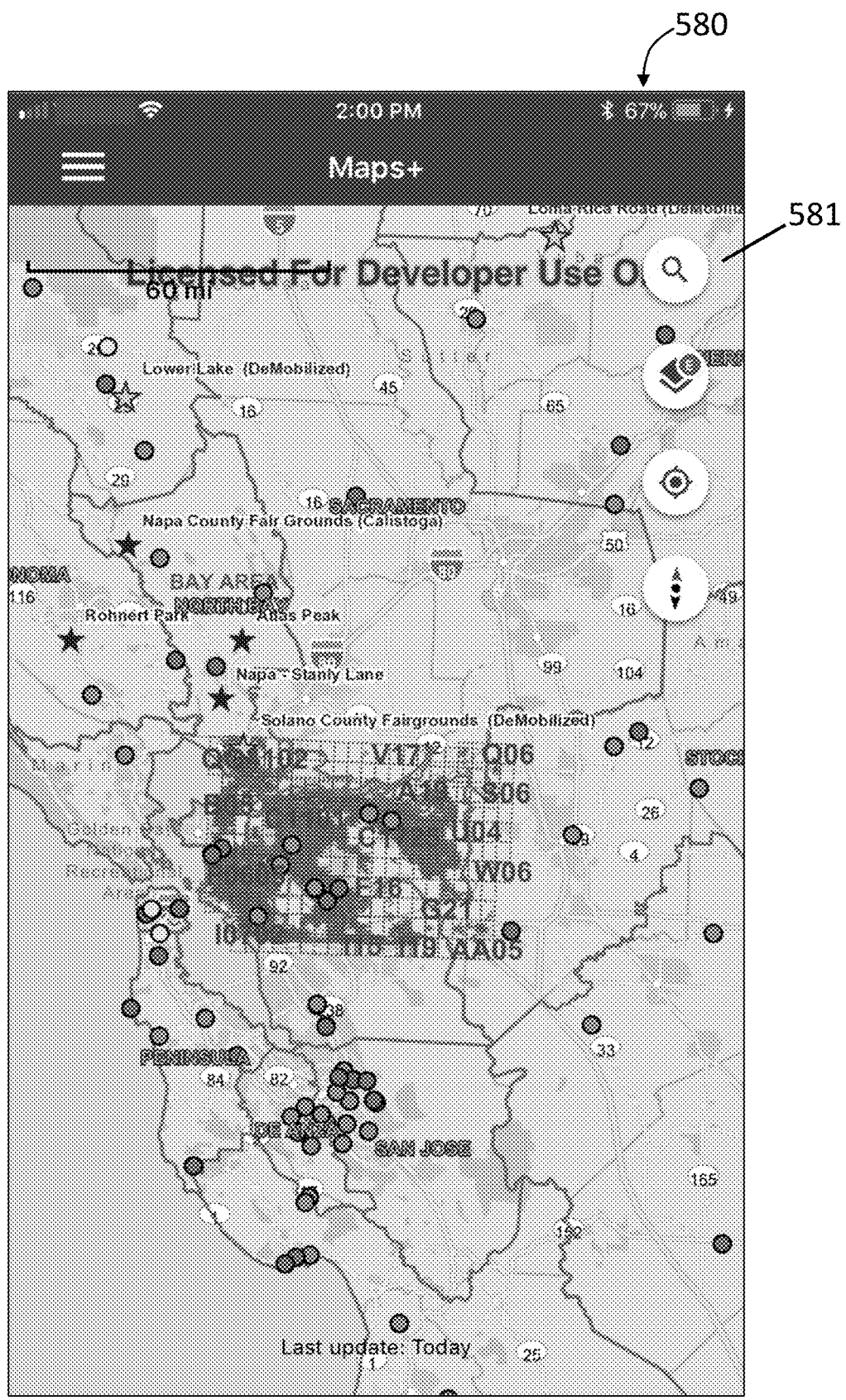
FIG. 23 shows a display of a resource map in a map view in emergency mode in accordance with some embodiments of the invention.

FIG. 22 illustrates a display 560 including a resource map 561 with emergency settings toggle display 565 in accordance with some embodiments of the invention, and FIG. 23 shows a display of a resource map 580 in a map view in emergency mode in accordance with some embodiments of the invention. As illustrated, some embodiments include a toggle display 565 that includes various toggles for use in selecting or altering the resource map 561, including, but not limited to, satellite view toggle 567, field intelligence view toggle, and emergency layers toggle 571. Following user selection, the display 560 can be updated based on a user's selection. For example, display 580 represents an updated display 560 with the resource map 581 comprising the resource map 561 and the toggle display 565 removed from the display 580.

Figure 24:
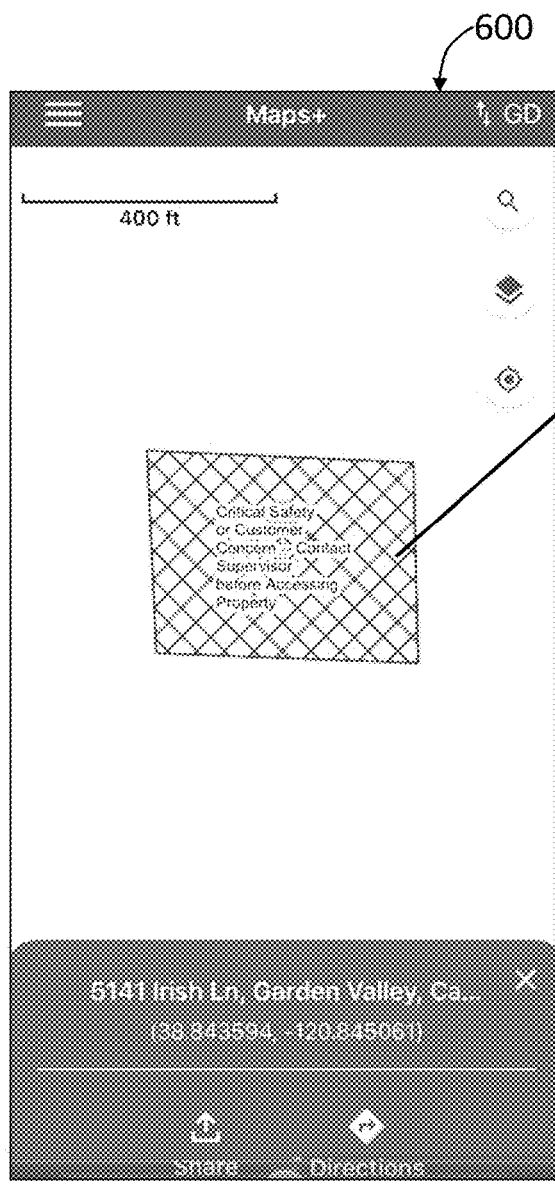
FIGS. 24-25 illustrate a safety access feature in accordance with some embodiments of the invention.
Figure 25:
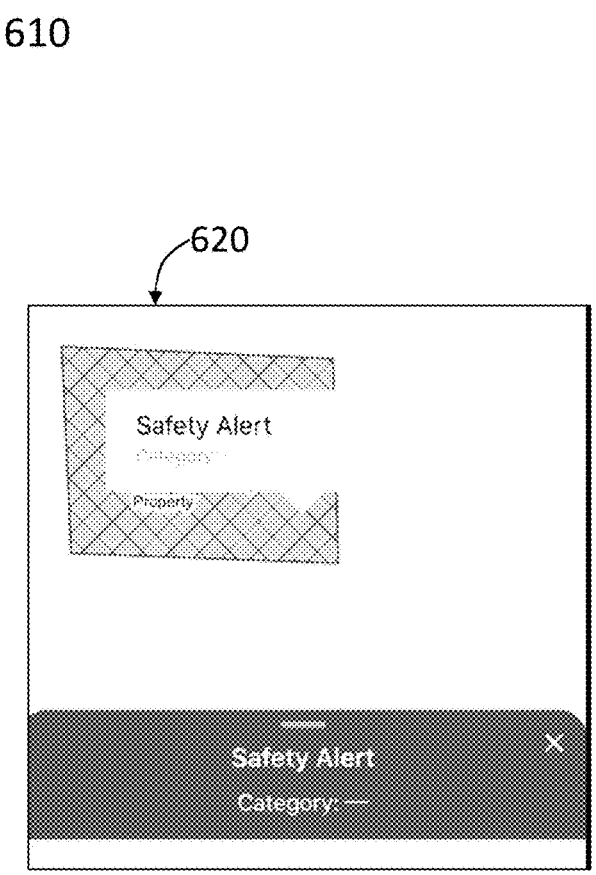

FIGS. 24-25 illustrate a safety access feature in accordance with some embodiments of the invention. For example, in some embodiments, the resource mapping system can show a display 600 with a safety alert 610. In some embodiments, a safety identifier 620 can be displayed for any asset to enable a user to quickly locate an asset and to display detailed information related to the asset. Further, in some embodiments, the display 600 can include an address display window 612 with sharing and/or direction functions 614 as described earlier.

Figures 26A, 26B:
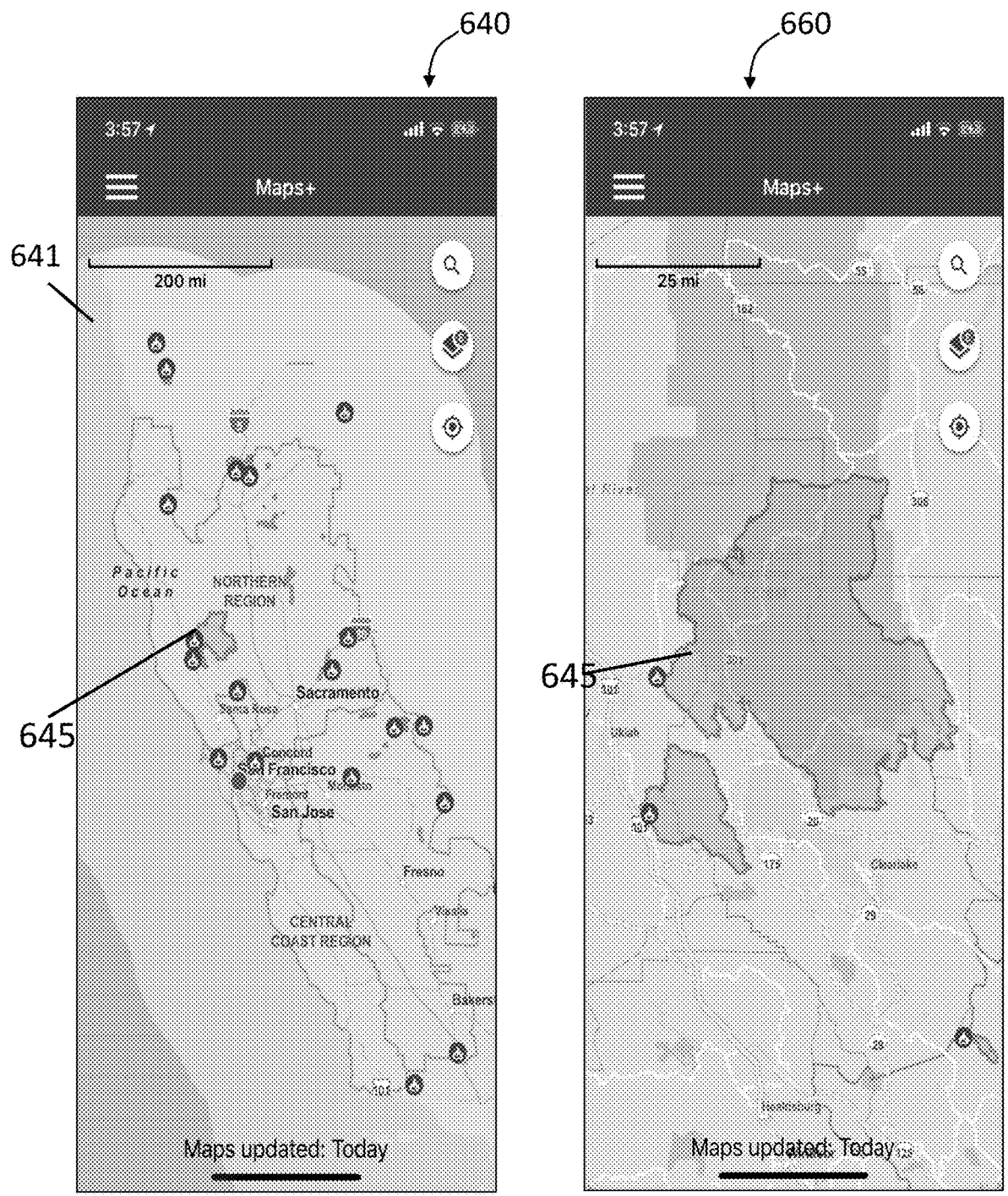
FIG. 26A illustrates a display including a resource map in emergency mode in accordance with some embodiments of the invention.
FIG. 26B illustrates a display of a close-up or enlarged portion of the resource map of FIG. 26A in accordance with some embodiments of the invention.

In some embodiments, the resource mapping system can process a resource map including a safety or emergency-related information layer. For example, in some embodiments of the invention, the resource mapping system can process a resource map that can be enabled for a fire operational layer. Some embodiments include an outage layer comprising details of an outage, and/or outage perimeter. In some embodiments, a fire layer can include an active fire identification and/or an active fire perimeter. In reference to FIG. 26A, some embodiments include a display 640 with an emergency mode map 641 with a fire and/or fire perimeter. In some embodiments, a user can zoom into one or more regions of the fire and/or fire perimeter as depicted in the display of FIG. 26B. In some embodiments, portions of the display 640 can include a location, and/or fire identification, and/or status of a fire or other natural or human-caused disaster. In some embodiments, the display 640 can provide access icons to a sharing of any portion of the display 640 or information on the display 640 (represented in the display 680 in FIG. 26C). In some further embodiments, the display 640 can include directions and/or a link or icons to directions to the location and/or any other point or reference of the map.

As shown in FIG. 27, illustrating a display 700, some embodiments include map preferences selection such as toggles for fire layers, and/or access road, and/or field intelligence. For example, FIG. 26A illustrates a display 640 including a resource map 641 in emergency mode showing an active fire area 645 in accordance with some embodiments of the invention. Further, FIG. 26B illustrates a display 660 of a close-up or enlarged portion of the resource map 640 of FIG. 26A showing active fire area 645 in accordance with some embodiments of the invention. Further, FIG. 26C illustrates a display 680 of a close-up or enlarged portion of the resource map 640 of FIG. 26A including identification window 685, and information sharing window 687 accordance with some embodiments of the invention. In some embodiments, the identification window 685 can be positioned on the display 680 to identify the active fire area 645. Further, in some embodiments, the information sharing window 687 can include a sharing function 687a to enable a user to share at least a portion of the display 680 and/or information in the display 680. Further, in some embodiments, the information sharing window 687 can include a directions function 687b to enable a user to receive directions to the active fire area 645. Further, FIG. 27 illustrates a display 700 of a resource map 640 with emergency mode map preference and settings 705 in accordance with some embodiments of the invention. In some embodiments, the emergency mode map preference and settings 705 can include divisions, layers, and "basemap" selector 712, an emergency layers toggle 714 including a fire layers toggle 716, an active "LOB" features 718, including an access road toggle 719*a*, field intelligence toggle 719*b*, and information section 710.

Figure 28:
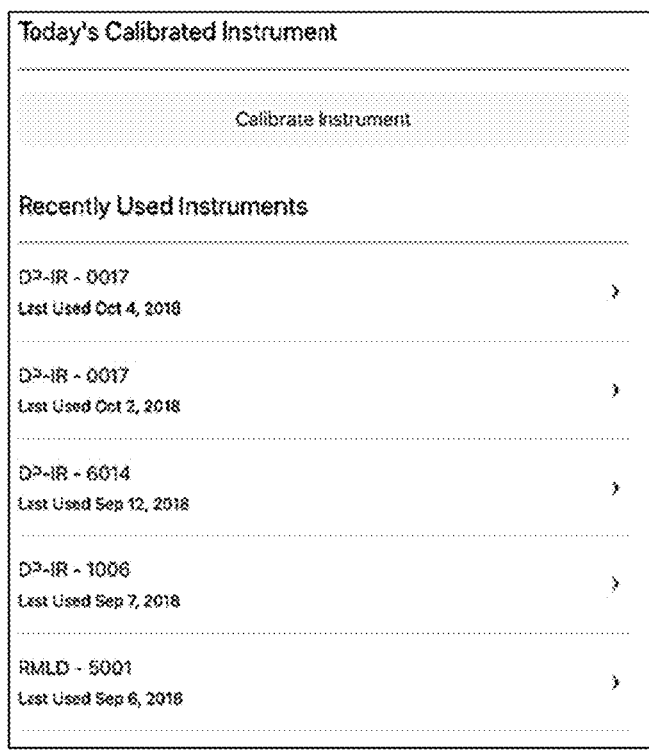
FIG. 28 illustrates an instrument calibration display in accordance with some embodiments of the invention.
Figure 29:
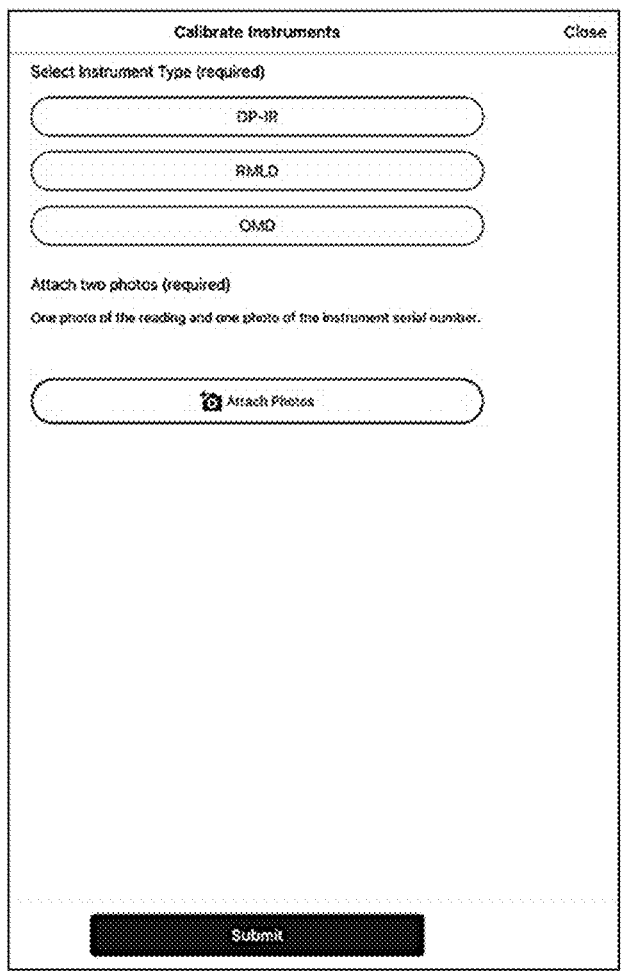
FIG. 29 illustrates an instrument calibration selection display in accordance with some embodiments of the invention.
Figures 30, 31:
FIG. 30 illustrates a calibrate instruments display in accordance with some embodiments of the invention.
FIG. 31 illustrates a work assigned display in accordance with some embodiments of the invention.

FIG. 28 illustrates an instrument calibration display 720 in accordance with some embodiments of the invention. In some embodiments, the display 720 can show one or more recently accessed or used equipment and an option to calibrate equipment. Some embodiments include a system generation of an instrument calibration selection display. For example, FIG. 29 illustrates an instrument calibration selection display 740 in accordance with some embodiments of the invention. In some embodiments, the display can comprise a form launched from an asset configuration display. Further, some embodiments include a system generation of a calibrate instruments display. For example, FIG. 30 illustrates a calibrate instruments display 760 in accordance with some embodiments of the invention. In some embodiments, the display 760 can comprise a form including elements after certain selections, and/or one or more images of an instrument, and/or serial number, and/or one or more readings.

Some further embodiments include a system generation of a work assigned display. For example, FIG. 31 illustrates a work assigned display 780 in accordance with some embodiments of the invention. In some embodiments, the work assigned display 780 can comprise configurations and activities based on work assigned from a work management system.

Figure 32:
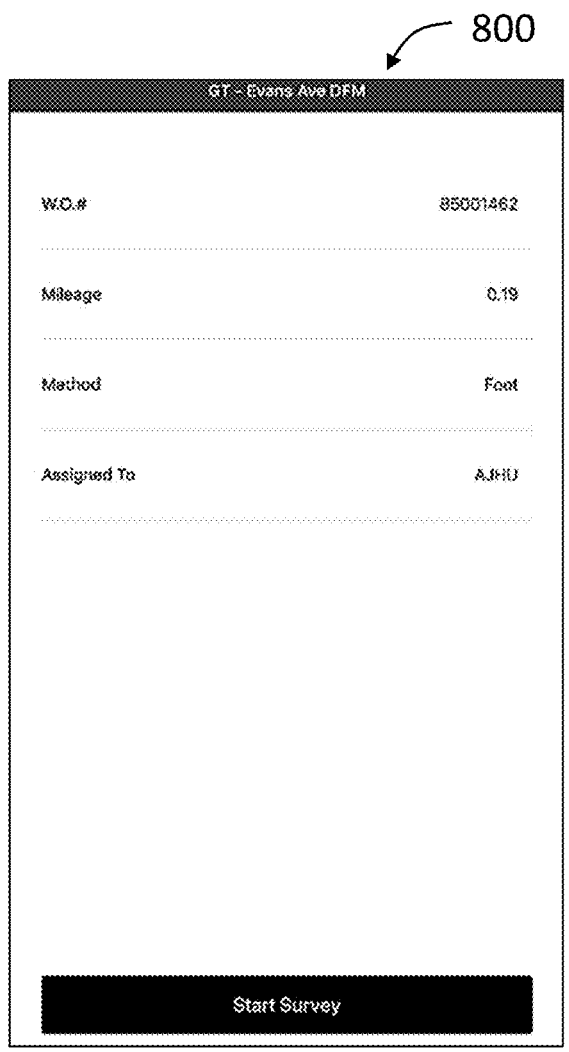
FIG. 32 illustrates a work detail display in accordance with some embodiments of the invention.
Figure 33:
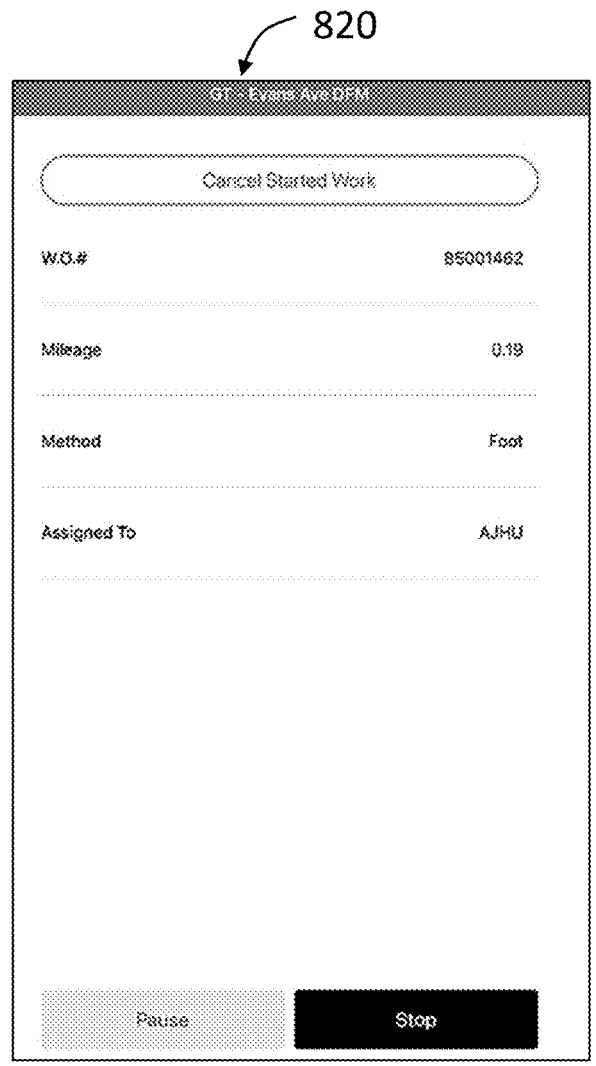
FIG. 33 illustrates a task display in accordance with some embodiments of the invention.
Figure 34:
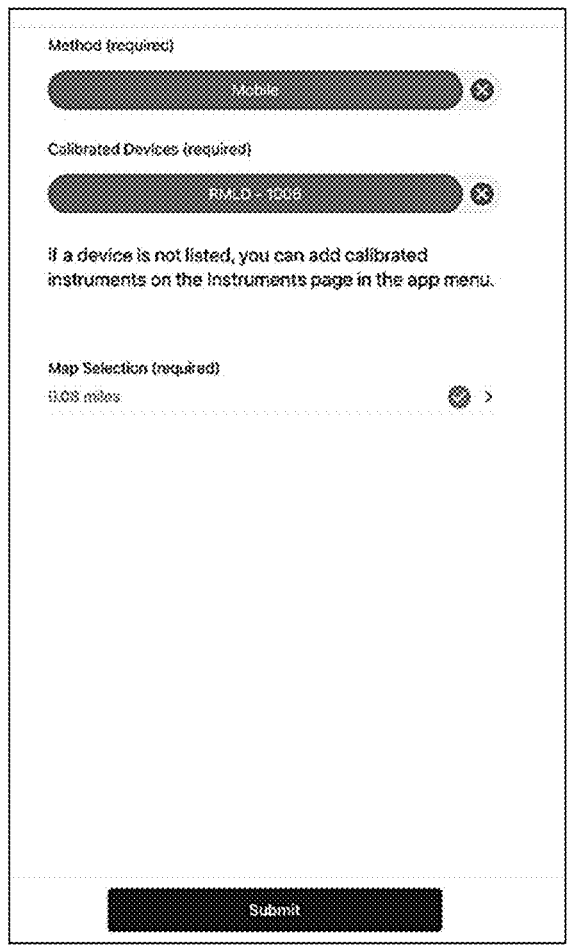
FIG. 34 illustrates a stop task activity display in accordance with some embodiments of the invention.

Some embodiments include a system generation of a work detail display, task display, stop task activity display. For example, FIG. 32 illustrates a work detail display 800 in accordance with some embodiments of the invention, and FIG. 33 illustrates a task display 820 in accordance with some embodiments of the invention. In some embodiments, the work detail display 800 of FIG. 32 can comprise work detail with associated activity "start survey". In some embodiments, the task display 820 of FIG. 33 can enable a start and stop period, cancel, pause, and stop. Further, FIG. 34 illustrates a stop task activity display 840 in accordance with some embodiments of the invention. In some embodiments, form elements can be dynamic based on activities that have been performed.

Figure 35:
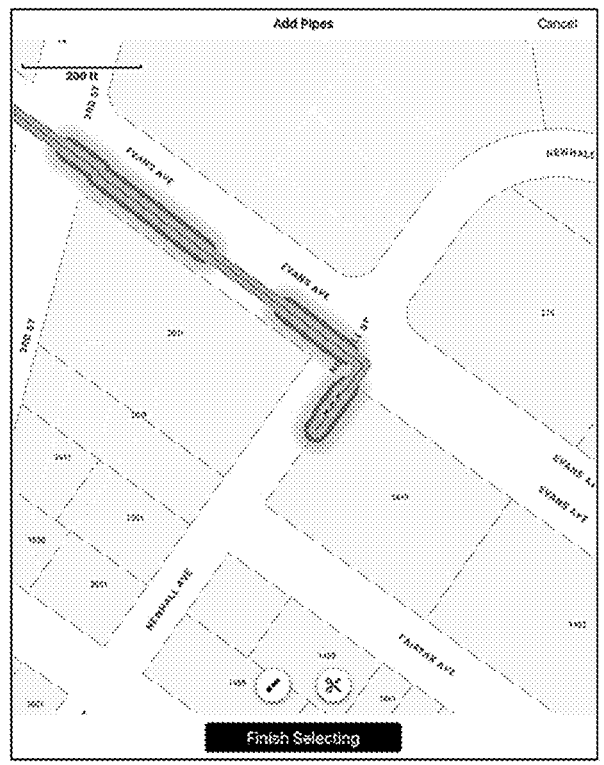
FIG. 35 illustrates a work documentation toolset display in accordance with some embodiments of the invention.

Some embodiments include a system generation of a toolset display. For example, FIG. 35 illustrates a work documentation toolset display 860 in accordance with some embodiments of the invention. In some embodiments, selections can be made and displayed on a location map on the display 860.

Figure 36:
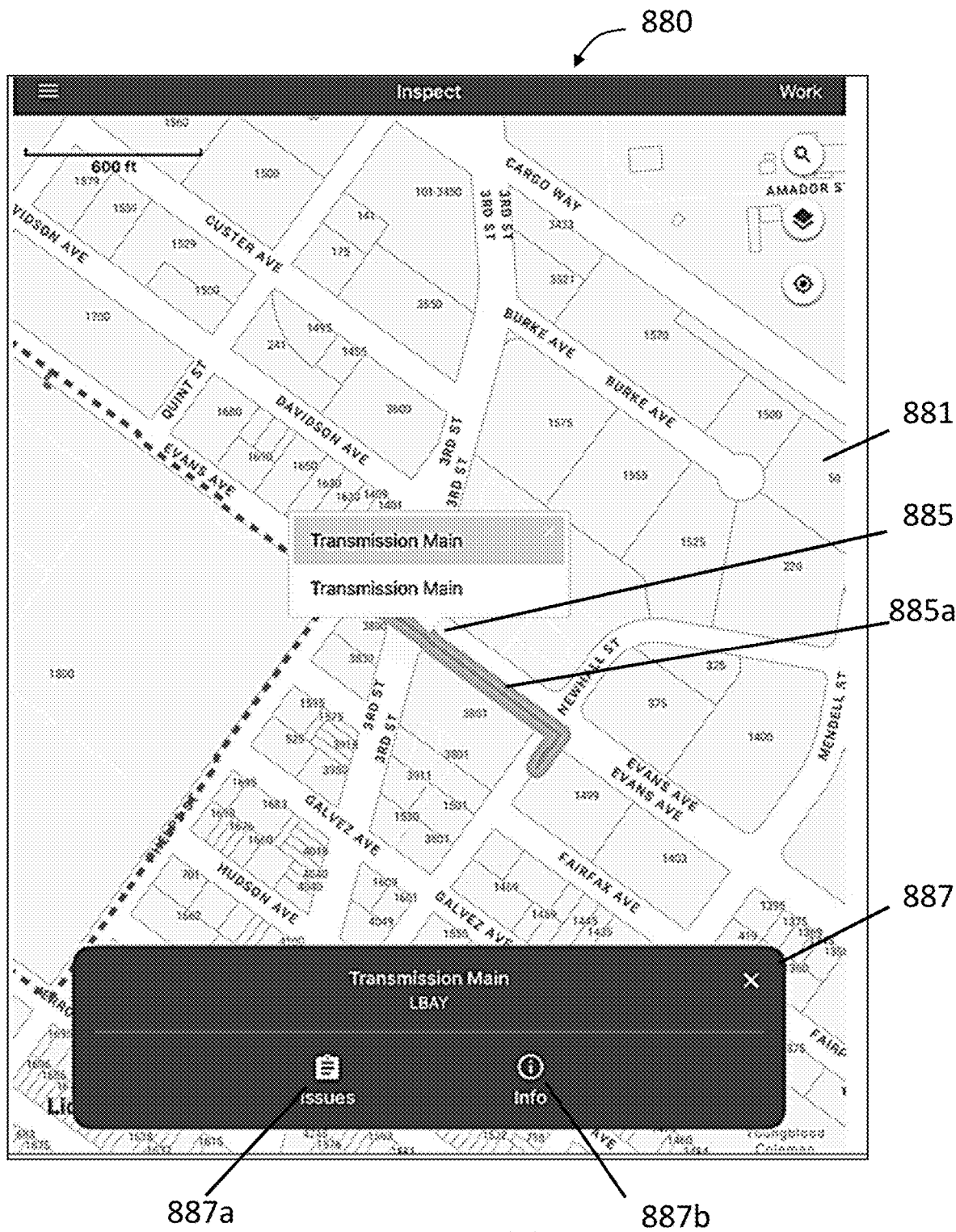
FIG. 36 illustrates a configured asset display in accordance with some embodiments of the invention.

Some embodiments include a system generation of configured assets. For example, FIG. 36 illustrates a "configured assets" display 880 in accordance with some embodiments of the invention. In some embodiments, configured assets 885 can be shown with an issues tab 887. In this non-limiting embodiment, the configured assets 885 can comprise a transmission main 885*a* shown outlined on a map 881 of the display 880. In some embodiments, the issues tab 887 can include a selector for reviewing issues 887*a* and/or for information 887*b*.

Figure 37:
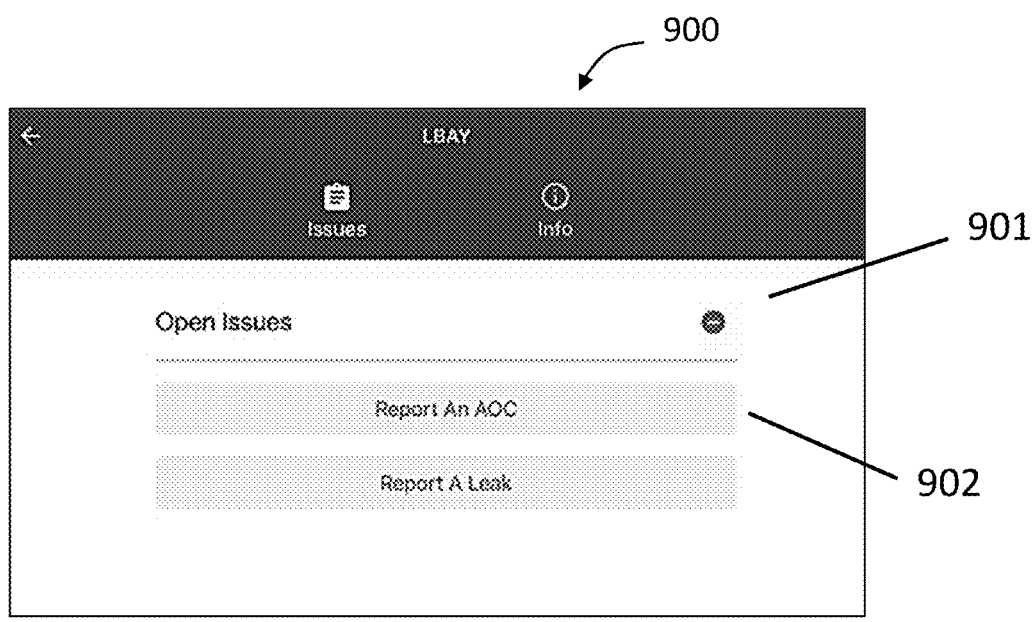
FIG. 37 illustrates an asset association display in accordance with some embodiments of the invention.

Some embodiments include a system generation of an asset association display. For example, FIG. 37 illustrates an asset association display 900 in accordance with some embodiments of the invention. In some embodiments, multiple activities or issues can be associated with a single asset. In some embodiments, the asset association display 900 can illustrate a display of open issues 901 and/or include reporting features 902 where a user can report specific asset issues.

Figure 38:
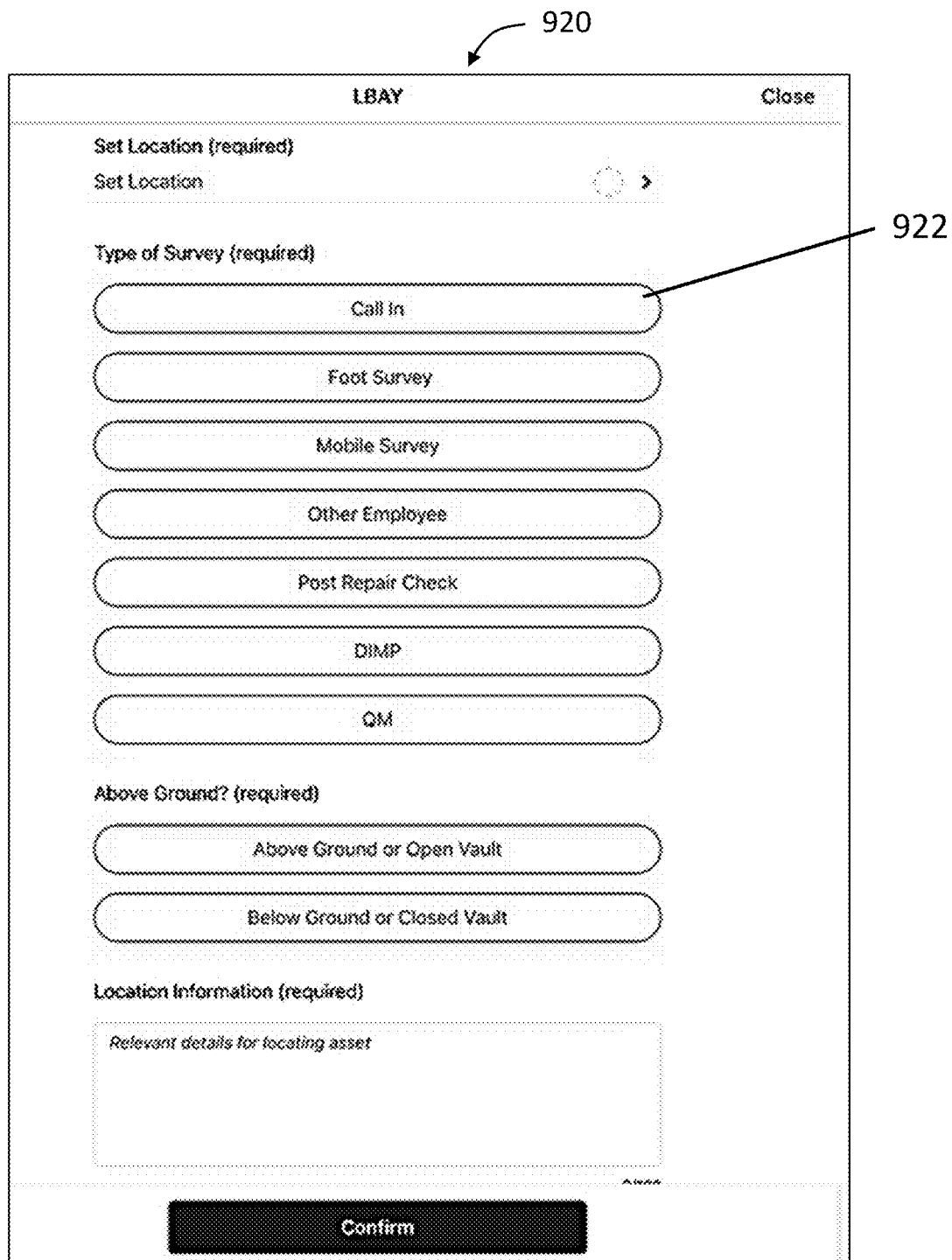
FIG. 38 illustrates a work selection display in accordance with some embodiments of the invention.

Some embodiments include a system generation of a work selection display. For example, FIG. 38 illustrates a work selection display 920 in accordance with some embodiments of the invention. In some embodiments, icons or menus 922 can be used to provide work and equipment information or selection.

Figure 39:
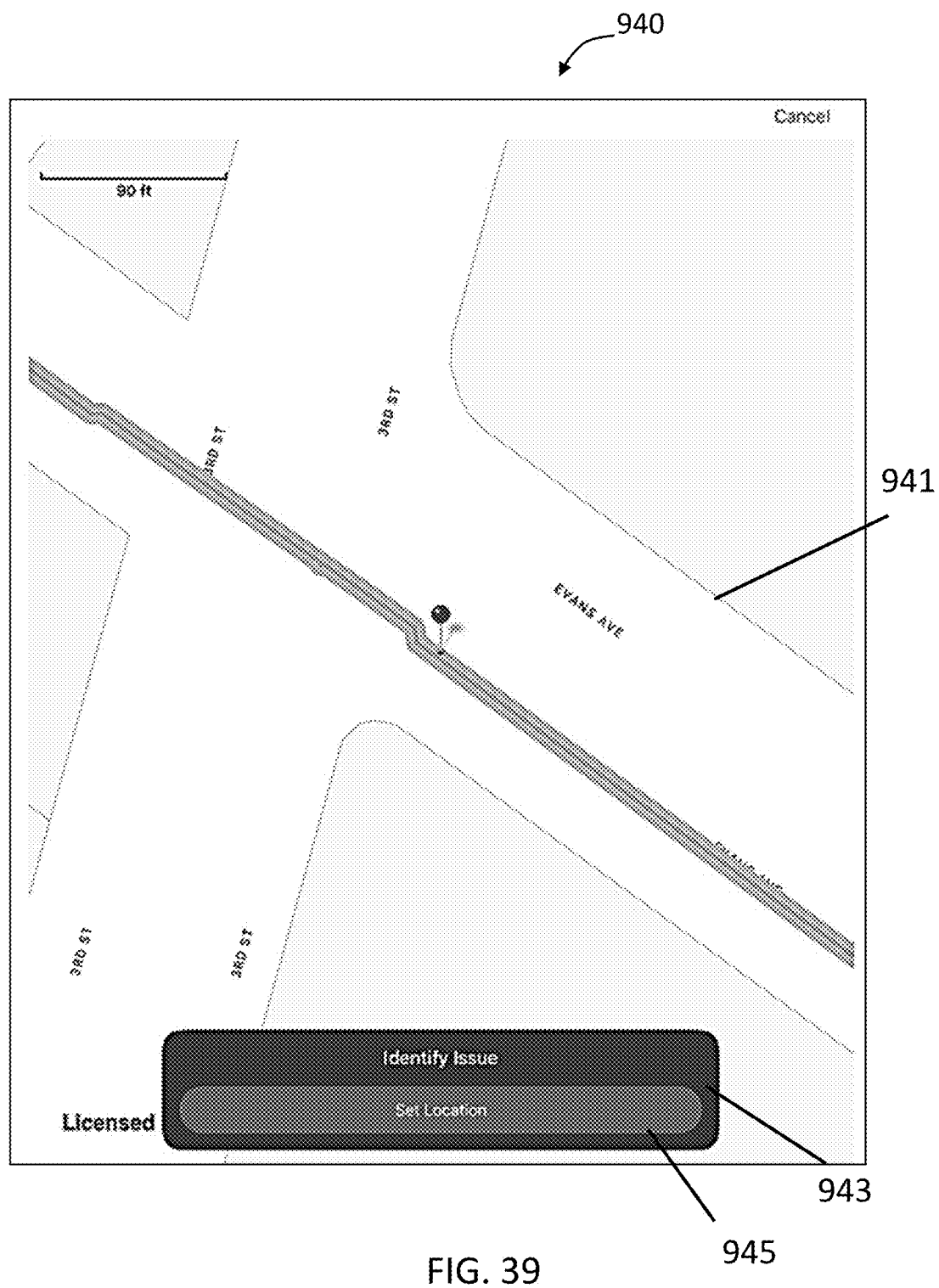
FIG. 39 illustrates an activity map display in accordance with some embodiments of the invention.

Some embodiments include a system generation of an activity map display. For example, in some embodiments, forms can couple back to application features. For example, FIG. 39 illustrates an activity map display 940 in accordance with some embodiments of the invention. In some embodiments, the maps 941 can be used to return a latitude and/or longitude back to the activity. In some embodiments, a banner 943 can be used to identify an issue and set a location 945 of an asset.

Figure 40:
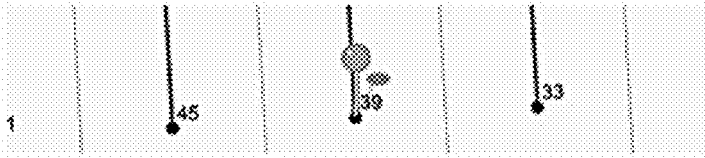
FIG. 40 illustrates a meter information display in accordance with some embodiments of the invention.

Some embodiments include a system generation of a meter information display. For example, FIG. 40 illustrates a meter information display 960 in accordance with some embodiments of the invention. In some embodiments, an eyeball icon 965 or other suitable object can indicate the availability of computer vision. In some embodiments, the meter information display 960 can include an address and/or location display 962 showing the address and/or map location of an asset. In some embodiments, an entry field 964 can be used to enter an identifier such as an asset meter number. In some embodiments, a comments field 966 can include information about an asset or an issue with an asset. In some embodiments, a photo attachment function 968 can be used to upload images.

Figure 41:
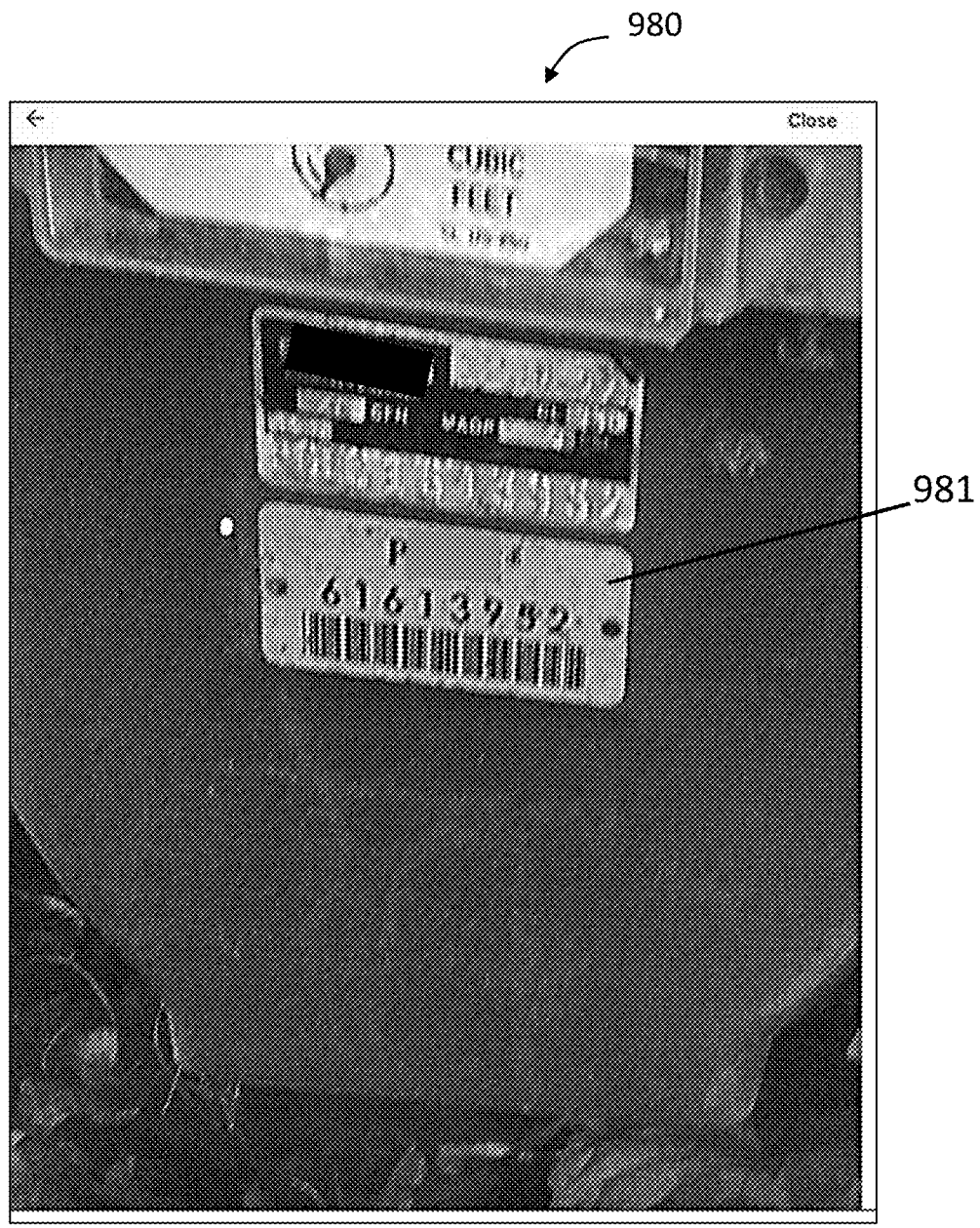
FIG. 41 illustrates a meter with barcode in accordance with some embodiments of the invention.
Figure 42:
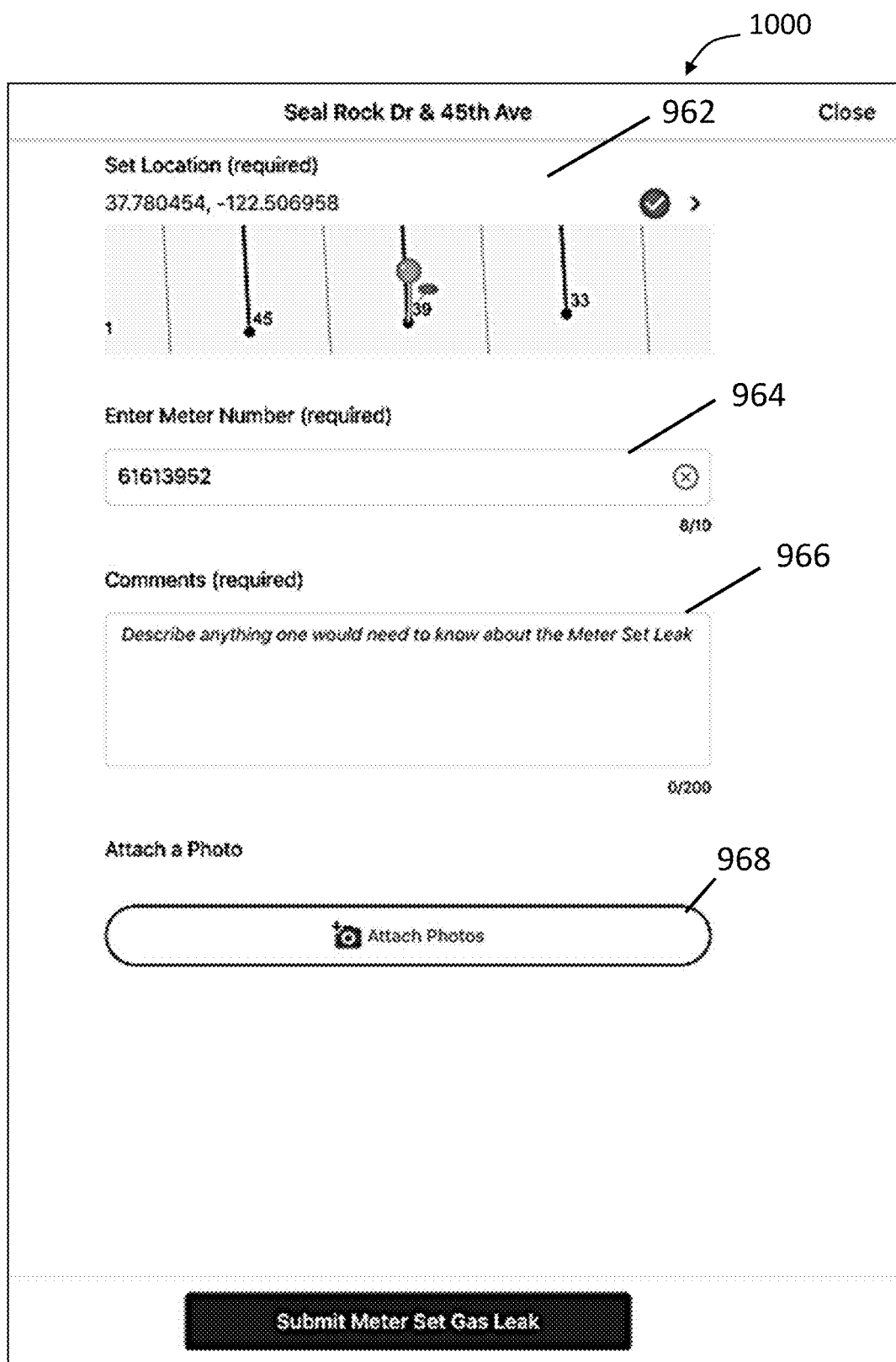
FIG. 42 illustrates an updated meter information display in accordance with some embodiments of the invention.

FIG. 41 illustrates a meter 980 including a tag with barcode 981 in accordance with some embodiments of the invention. In some embodiments, the resource mapping system can collect data from the meter tags. In some embodiments, the bar code 981 can be used to train a model of the resource mapping system to read meters that don't have a bar code. Some further embodiments include a system generation of an updated meter information display 960. For example, FIG. 42 illustrates an updated meter information display 1000 in accordance with some embodiments of the invention. In some embodiments, the form can be auto-populated with data from the computer vision model and/or a bar code (e.g., such as the bar code 981). In some embodiments, this can include an entry field 964, a comments field 966, and a photo attachment function 968.

Figure 43:
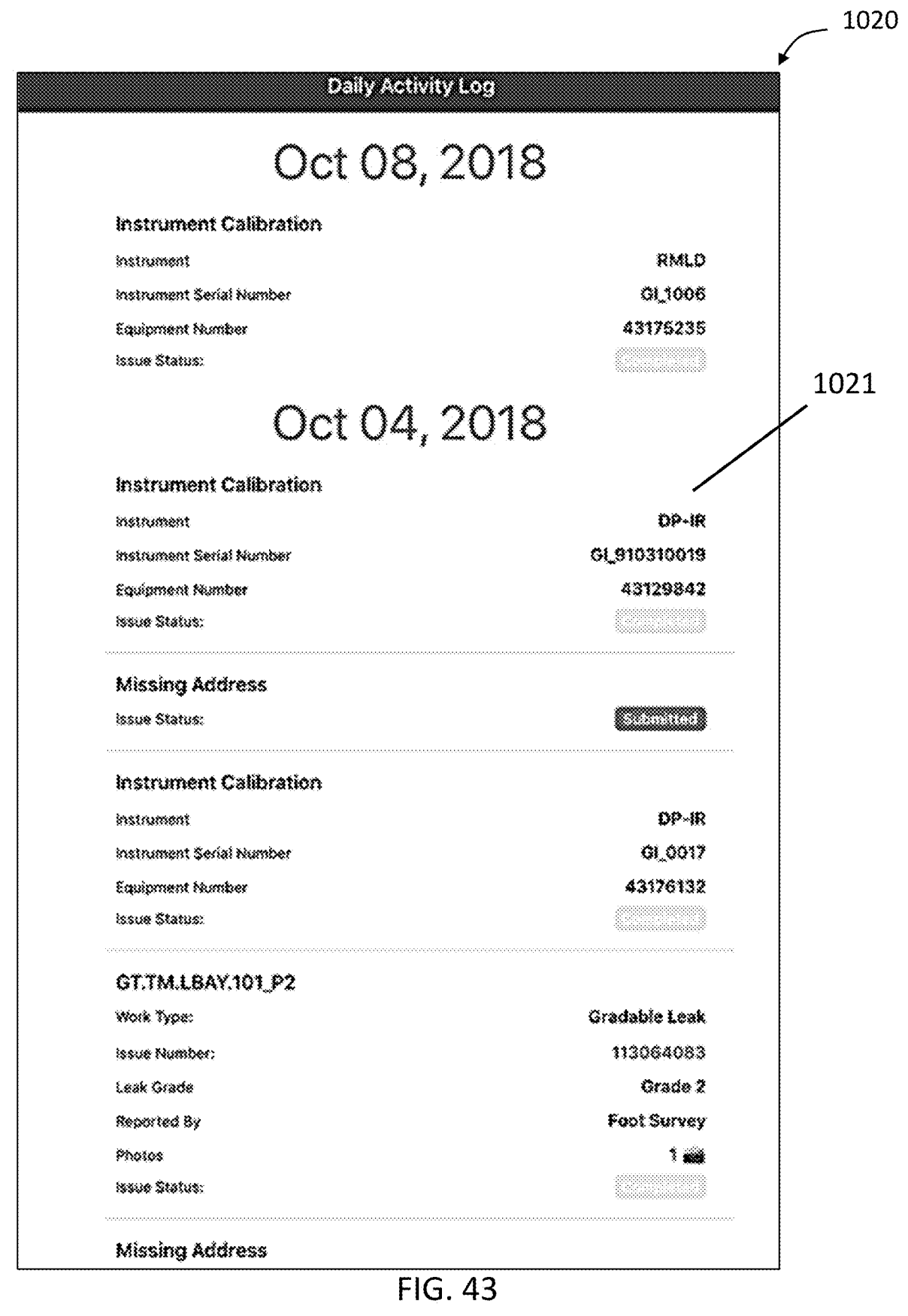

Some embodiments include a system generation of an activity summary display. For example, FIG. 43 illustrates an activity summary display 1020 in accordance with some embodiments of the invention. In some embodiments, this display 1020 can provide a list of past work based on the user. In some embodiments, the data shown on the list view 1021 can be set by the activity configurator, and can include, but not be limited to, instrument calibration information, address information, work details, etc.

Figure 44:
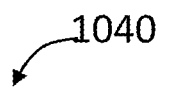
FIG. 44 illustrates an activity summary display in accordance with some embodiments of the invention.

Some embodiments include a system generation of an activity summary display. For example, FIG. 44 illustrates an activity summary display 1040 in accordance with some embodiments of the invention. In some embodiments, the activity summary display 1040 can include data submitted to the resource mapping system, and data pulled from a source system (hereinafter "alpha system") and one or more device sensors. In some embodiments, the submitted data can be displayed in an upper region of the form, and the data pulled from the alpha system and one or more device sensors can be displayed in a lower region of the form.

Figure 45:
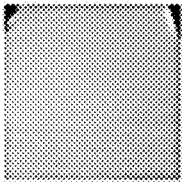
FIG. 45 illustrates a webpage display in accordance with some embodiments of the invention.

Some embodiments include a system generation of a webpage display. For example, FIG. 45 illustrates a webpage display 1060 in accordance with some embodiments of the invention. In some embodiments, the webpage display 1060 includes data from an activity, such as an asset site activity. In some embodiments, tapping on or accessing the details card, icon, or function can enable a user to view raw data.

In some embodiments, the resource mapping system can enable one or more coupled users receive, analyze, input, modify, create and send resource related data and/or location related data to and from the system, including to and from one or more enterprise applications. In some embodiments, at least one software application running on one or more processors can be configured to be coupled for communication over networks through the Internet. In some embodiments, one or more wired and/or wirelessly coupled components of the network can include one or more resources for data storage comprising resource or asset data, mapping data, user data, or a combination thereof. In some embodiments, this can include any other form of computer readable media in addition to the computer readable media for storing information, and can include any form of computer readable media for communicating information from one electronic device to another electronic device. In some embodiments, the servers and/or databases can reside in an intranet separated from external servers and/or databases (e.g., such as those of one or more third-party servers, databases, or services) using one or more firewalls. In some embodiments, the resource mapping system does not require connecting to the Internet because of one or more features of the system architecture of the resource mapping system. For example, in some embodiments, the resource mapping system can be hosted by a user's stand-alone computer system (such as a desktop PC or a laptop, and/or mobile device).

Figure 46:
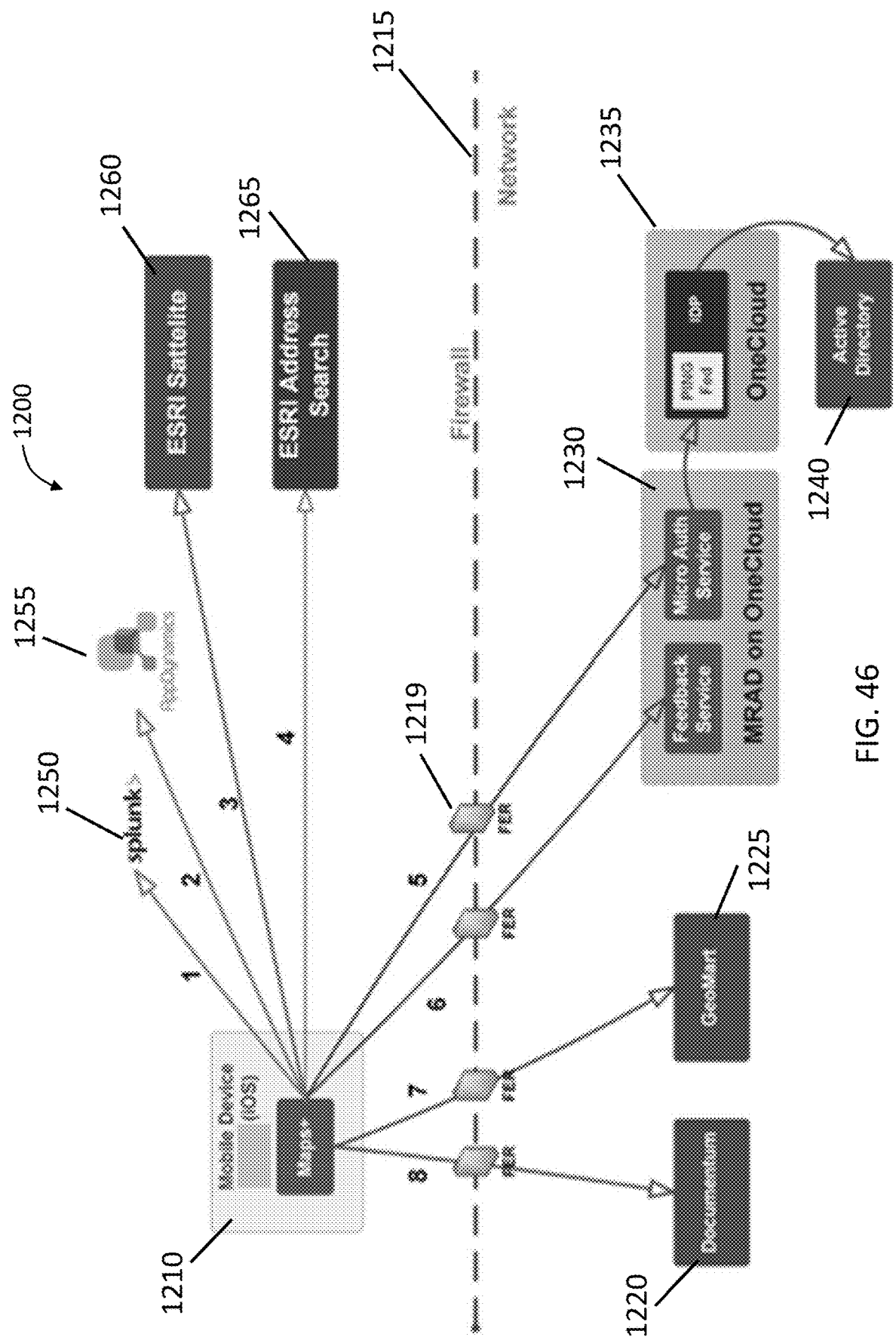
FIG. 46 represents resource mapping server and system architectures in accordance with some embodiments of the invention.
Figure 47:
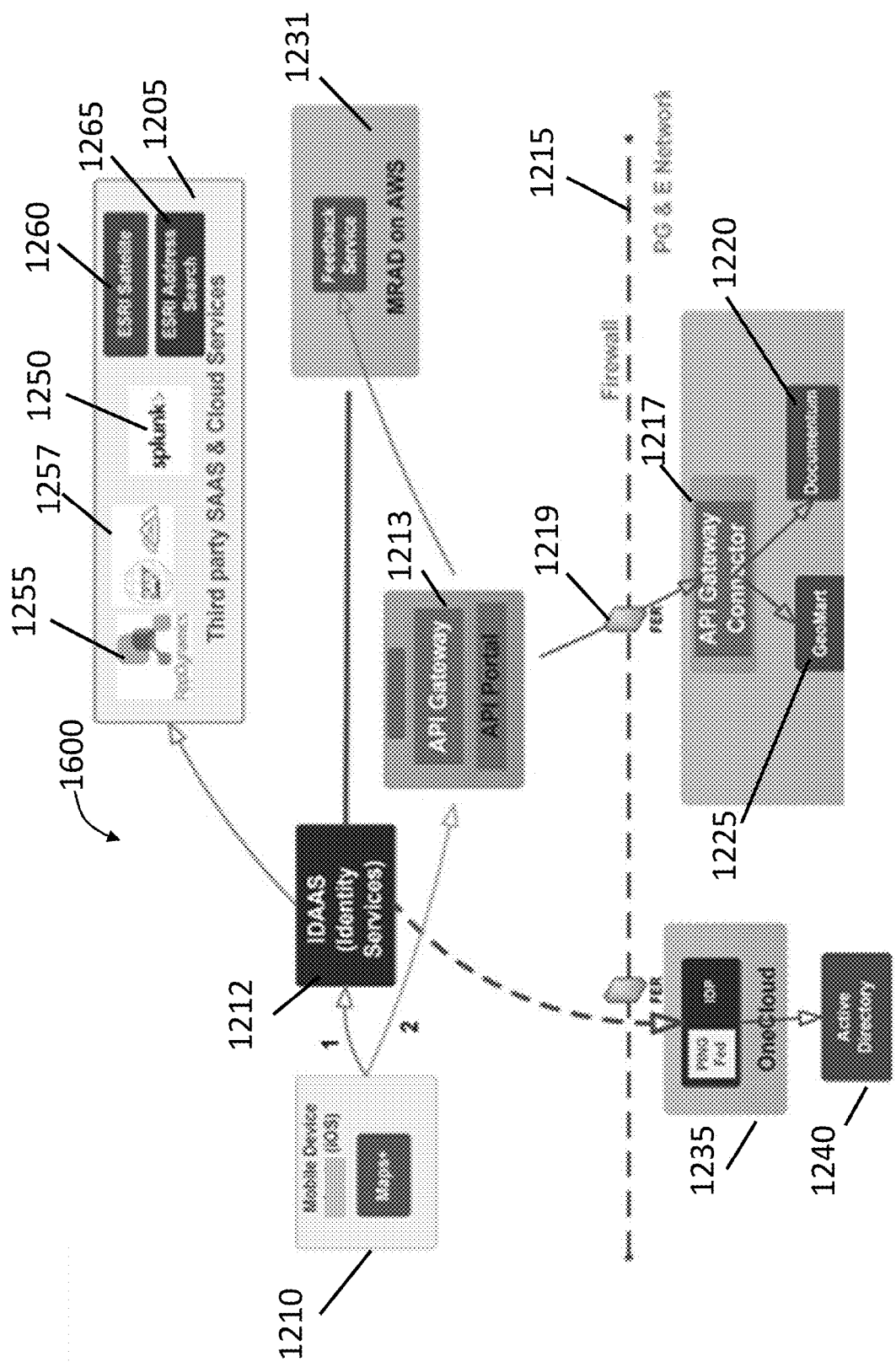
FIG. 47 is an example of a resource mapping system architecture in accordance with some embodiments of the invention.

Non-limiting example embodiments of system architectures of the resource mapping system are shown in FIGS. 46 and 47. For example, FIG. 46 represents resource mapping system architecture 1200 in accordance with a further embodiment of the invention. In some embodiments, the user device 1210 can couple to one or more external third-party services, including, but not limited to a Splunk® Enterprise and Splunk Cloud™ 1250, and/or AppDynamics 1255, and/or Esri® Satellite 1260, Esri® address search 1265. Further, in some embodiments, the user device 1210 can securely couple through a firewall 1215 to one or more databases and/or services, including, "Documentum" 1220, and/or "Geomart" 1225, and/or "Service" 1230, and/or "Process" 1235, and/or "Directory" 1240. Further, FIG. 47 is an example of a resource mapping system architecture 1600 in accordance with a further embodiment of the invention. For example, some embodiments include user device 1210 configured to communicate through an identity services 1212 and/or gateway 1213. In some embodiments, the identity services 1212 can couple to service 1231. Some embodiments include secure communications through firewall exception request (FER) 1219 of firewall 1215. In some embodiments, the user device 1210 can couple to cloud services 1205, including, but not limited to, "AppDynamics" 1255, software as a service "SAAS" 1257, Splunk® 1250, Esri® satellite 1260, and Esri® address search 1265. Some embodiments include process 1235 coupled to active directory 1240. In some embodiments, the gateway 1213 can couple through the firewall 1215 to gateway connector 1217, coupled to "Geomart" 1225 and/or "Documentum" 1220.

In some embodiments, one or more of the system components can include a native operation system ("OS") guideline (e.g., such as Apple's guidelines for "iOS") written in modern "Swift" (e.g., such as Swift 4). In some embodiments, the system can use a universal application that supports Apple iPhone® and iPad® devices, including iPad® Split View. Some embodiments include accessibility for support for larger text. In some embodiments, one or more components of the system can comprise Esri® ArcGIS® runtime for foundational mapping capabilities and map views. Apple® is a registered trademark of Apple Inc. iPhone® and iPAD® are registered trademarks of Apple Inc., registered in the U.S. and other countries. iOS® is a registered trademark of Cisco Systems, Inc. in the United States and is used by Apple Inc. under license. ArcGIS® is a registered trademark of Environmental Systems Research Institute, Inc.

Figure 48:
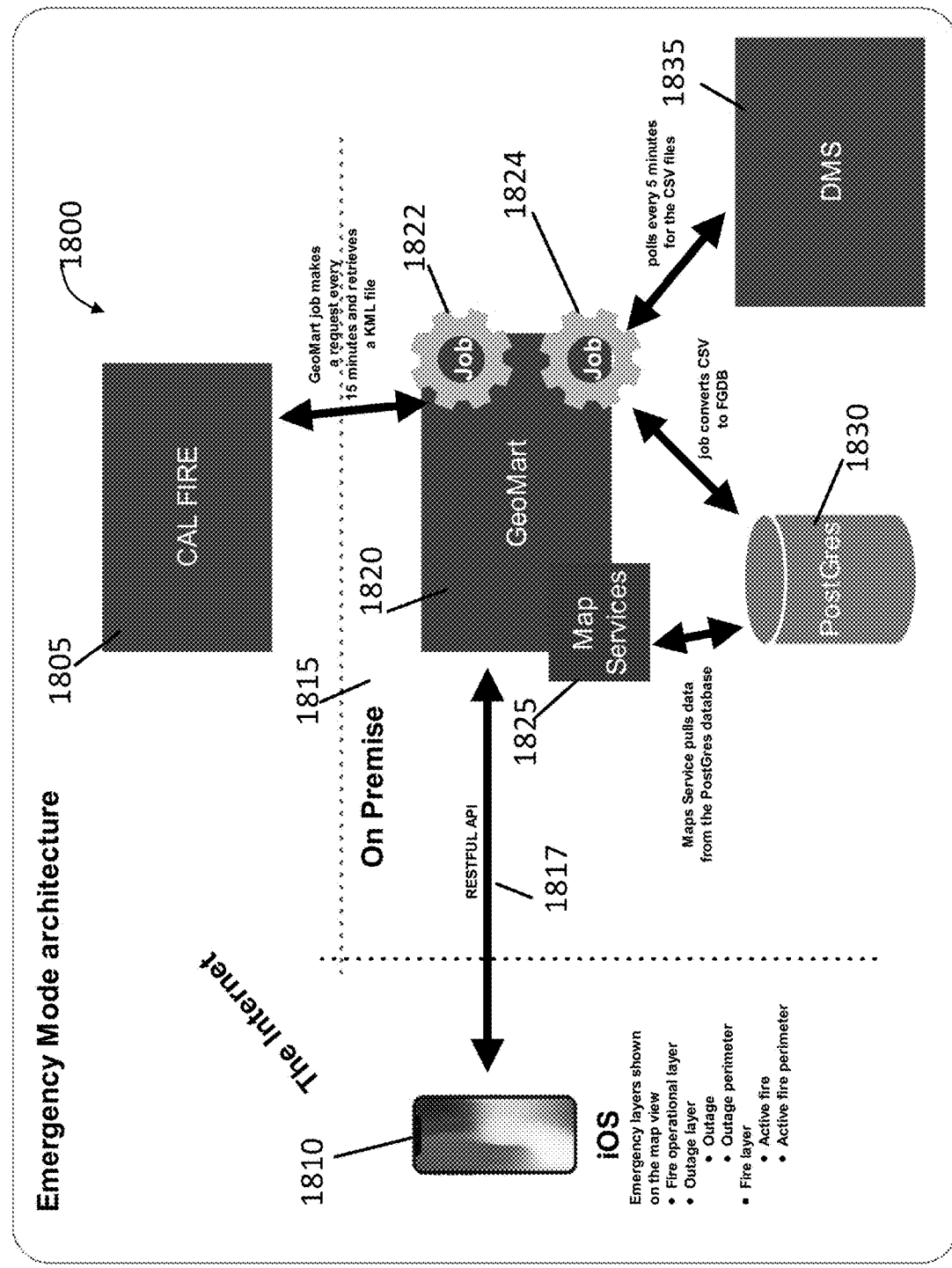
FIG. 48 illustrates an emergency mode architecture in accordance with some embodiments of the invention.

FIG. 48 illustrates an emergency mode architecture 1800 in accordance with some embodiments of the invention. In some embodiments, within an internal architecture 1815, a "GeoMart" job or application 1820 can run 1822 to access and/or retrieve fire or other emergency data from an outside server or database 1805. In some embodiments, a "GeoMart" job or application 1820 can run 1824 to access and/or retrieve using one or more of a map service application 1825, "PostGres" database 1830, "DMS", emergency information and mapping information 1835 can be displayed or merged to data displayable on a user's mobile device 1810 couple through a "Restful" API 1817.

In some embodiments, offline users can continue to interact with a map view and perform most searches while in poor or no internet connectivity areas (e.g., after an on-boarding experience). Further, in general, the resource mapping system can enable a very rapid startup (e.g., less than 1.0 second for the map view to appear and be responsive when launching the application after on-boarding experience). In some embodiments, the resource mapping system can provide a fluid and responsive map view response to gestures, with very responsive panning and zooming on the map view.

Some embodiments include support for a DeltaSync protocol and/or automatic map update ("AMU") that can enable the application to download smaller files to keep the asset data up to date on the map view. Some embodiments include an authentication support for Apple® Face ID/Touch ID or other conventional biometric authentication. Some embodiments include an iOS password autofill, and can support iPhone® devices with notches. Some embodiments are supported with an Apple® iOS 10.3 or higher.

In some embodiments, the resource mapping system architecture can provide logic and asset data in an "iOS" application. In some embodiments, the resource mapping system can use network-attached storage to store geodatabase files (i.e., an SQLite file), base map files (i.e., vector tile package or VTPK files that are available from Esri® ArcGIS® platform and provide street maps, and land base including parcel information), configuration files (e.g., such as JSON files), and .MXD files (i.e., map documents used to create geodatabase files and published on an ArcGIS® server to create a feature service that a batch server can call to create geodatabase files). In some embodiments, the system can use Esri® ArcGIS runtime software for foundational mapping capabilities.

In some embodiments, the resource mapping system can use an Oracle® database. In some embodiments, a .NET service can be used to prepare URLs for data and can support mobile downloads. In some embodiments, the resource mapping system can interact and manage one or more user services, including, but not limited to, "micro-Auth" that supports a native login and returns a "session-Key", and/or "Feedback", where users can send feedback within a resource mapping system application.

Figure 49:
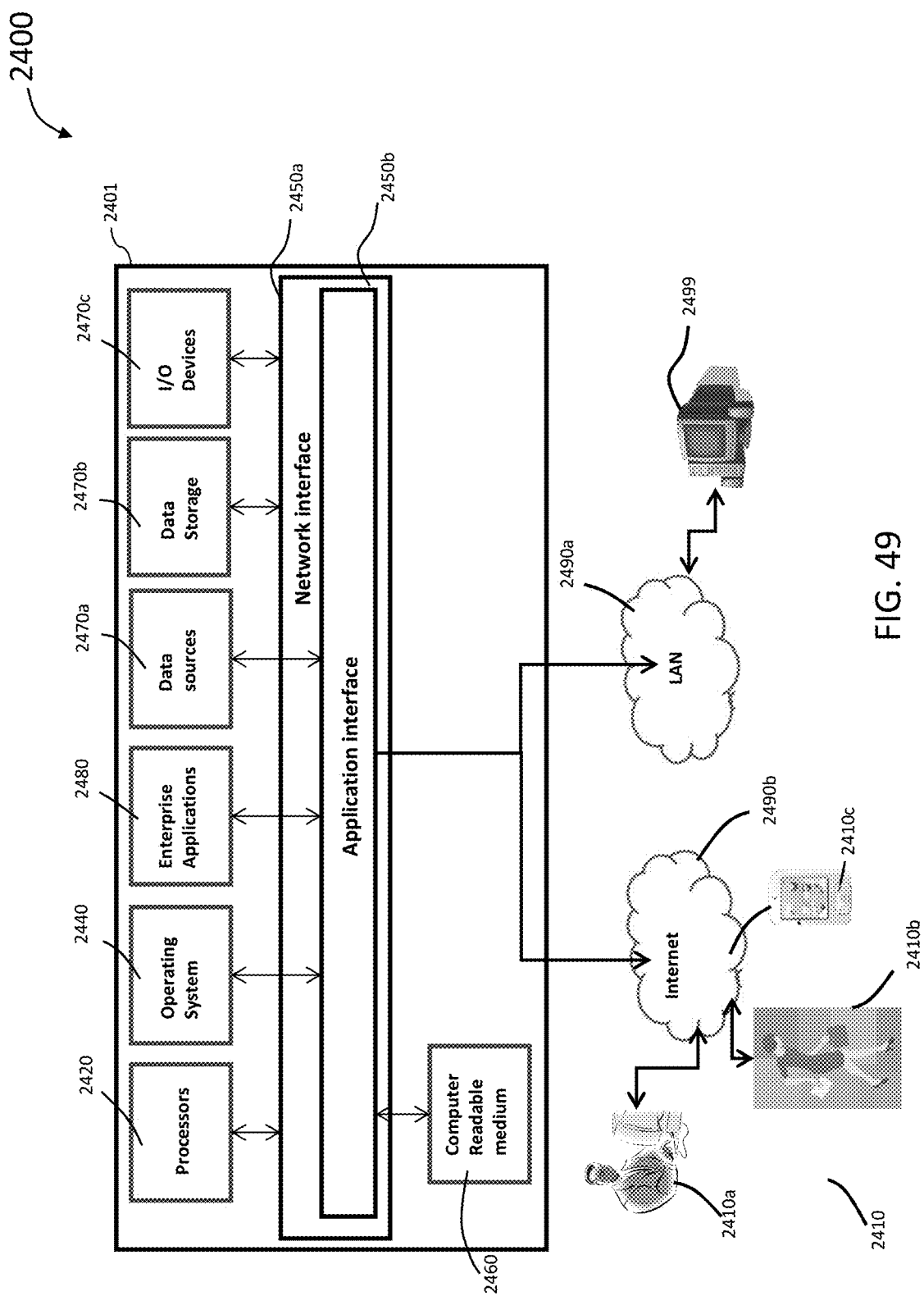
FIG. 49 provides an example of a computer or server system coupled to or operating the resource mapping system architectures of FIGS. 46-48 in accordance with some embodiments of the invention.

FIG. 49 provides an example of a computer or server system coupled to or operating the resource mapping system architectures of FIGS. 46-48 in accordance with some embodiments of the invention. In some embodiments, the computer or server system 2400 can be coupled to or configured for operating the resource mapping system architectures described earlier. In some embodiments, the computer or server system 2400 can be configured for operating and processing components of the resource mapping system in accordance with some embodiments of the invention. In some embodiments, the computer or server system 2400 can process one or more software modules of the resource mapping system and method applications, and can be configured to display information related to user content within one or more GUIs. In some embodiments, the computer 2401 of the computer or server system 2400 can process one or more software modules of the process optimization system and method applications, and can be configured to display information related to process optimization within one or more graphical user interfaces. For example, any of the non-limiting embodiments including displays, portals, or web pages described earlier can be processed and controlled by the computer system 2401. In some embodiments, the computer system 401 can comprise at least one computing device including at least one processor 2420. In some embodiments, the at least one processor 2420 can include a processor residing in or coupled to one or more server platforms. In some embodiments, the computer system 2401 can include a network interface 2450a and an application interface 2450b coupled to the least one processor 2420 capable of processing at least one operating system 2440. Further, in some embodiments, the interfaces 2450a, 2450b coupled to at least one processor 2420 can be configured to process one or more of the software modules 2480 (e.g., such as enterprise applications). In some embodiments, the software modules 2480 can include server-based software that can include process optimization system and method software modules. In some embodiments, the software modules 2480 can include server-based software that can include resource mapping software modules. In some embodiments, the software modules 2480 can operate to host at least one user account and/or at least one client account, and operating to transfer data between one or more of these accounts using the at least one processor 2420.

With the above embodiments in mind, it should be understood that the invention can employ various computer-implemented operations involving process optimization system and method data stored in computer systems. Moreover, the above-described databases and models throughout the process optimization system and method can store analytical models and other data on computer-readable storage media within the computer system 2401 and on computer-readable storage media coupled to the computer system 2401. In addition, the above-described applications of the process optimization system and method system can be stored on computer-readable storage media within the computer system 2401 and on computer-readable storage media coupled to the computer system 2401. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the computer system 2401 can comprise at least one computer readable medium 2460 coupled to at least one data source 2470a, and/or at least one data storage device 2470b, and/or at least one input/output device 2470c. In some embodiments, the invention can be embodied as computer readable code on a computer readable medium 2460. In some embodiments, the computer readable medium 2460 can be any data storage device that can store data, which can thereafter be read by a computer system (such as the computer system 2401). In some embodiments, the computer readable medium 2460 can be any physical or material medium that can be used to tangibly store the desired information or data or instructions and which can be accessed by a computer or processor 2420. In some embodiments, the computer readable medium 2460 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 2460 can transmit or carry instructions to a computer 2499 and/or at least one user 2410, including a router, private or public network, or other transmission device or channel, both wired and wireless. In some embodiments, the software modules 2480 can be configured to send and receive data from a database (e.g., from a computer readable medium 2460 including data sources 2470a and data storage 2470b that can comprise a database), and data can be received by the software modules 2480 from at least one other source. In some embodiments, at least one of the software modules 2480 can be configured within the system to output data to at least one user 2410 via at least one graphical user interface rendered on at least one digital display.

In some embodiments of the invention, the computer readable medium 2460 can be distributed over a conventional computer network via the network interface 2450a where the process optimization system and method system embodied by the computer readable code can be stored and executed in a distributed fashion. For example, in some embodiments, one or more components of the computer system 2401 can be coupled to send and/or receive data through a local area network ("LAN") 2490a and/or an internet coupled network 2490b (e.g., such as a wireless internet). In some further embodiments, the networks 2490a, 2490b can include wide area networks ("WAN"), direct connections (e.g., through a universal serial bus port), or other forms of computer-readable media 2460, or any combination thereof.

In some embodiments, components of the networks 2490a, 2490b can include any number of user devices such as personal computers including for example desktop computers, and/or laptop computers, or any fixed, generally non-mobile internet appliances coupled through the LAN 2490a. For example, some embodiments include personal computers 2499 coupled through the LAN 2490a that can be configured for any type of user including an administrator. Other embodiments can include personal computers 2499 coupled through network 2490b. In some further embodiments, one or more components of the computer system 2401 can be coupled to send or receive data through an internet network (e.g., such as network 2490b). For example, some embodiments include at least one user 2410 coupled wirelessly and accessing one or more software modules of the process optimization system and method system including at least one application 2480 via an input and output ("I/O") device 2470c. In some other embodiments, the computer system 2401 can enable at least one user 2410 to be coupled to access at least one application 2480 via an I/O device 2470c through LAN 2490a. In some embodiments, the user 2410 can comprise a user 2410a coupled to the computer system 2401 using a desktop computer, and/or laptop computers, or any fixed, generally non-mobile internet appliances coupled through the internet 2490b. In some further embodiments, the user 2410 can comprise a mobile user 2410b coupled to the computer system 2401. In some embodiments, the user 2410b can use any mobile computing device 2410c to wireless coupled to the computer system 2401, including, but not limited to, personal digital assistants, and/or cellular phones, mobile phones, or smart phones, and/or pagers, and/or digital tablets, and/or fixed or mobile internet appliances, or virtual reality display devices (e.g., such as VR helmets, goggles or glasses).

In some embodiments, the computer system 2401 can enable one or more users 2410 coupled to receive, analyze, input, modify, create and send data to and from the computer system 2401, including to and from one or more enterprise applications running on the computer system 2401. In some embodiments, at least one software application 2480 running on one or more processors 2420 can be configured to be coupled for communication over network 2490a and/or Internet network 2490b. In some embodiments, one or more wired or wirelessly coupled components of the network 2490a, 2490b can include one or more resources for data storage. For example, this can include any other form of computer readable media in addition to the computer readable media 2460 for storing information, and can include any form of computer readable media for communicating information from one electronic device to another electronic device.

In some embodiments, the above-described databases and systems throughout the resource mapping system architectures of FIGS. 46-48 can store a variety of data, including, but not limited to, resource mapping data, resource and asset data, resource and asset location data, resource and asset activity and alert data, analytical models and other resource data within the databases on computer-readable storage media of the computer system of FIG. 49. In addition, the above-described applications of the resource mapping system architectures of FIGS. 46-48 can be stored on computer-readable storage media, including within any portion of the database 2460. With the above embodiments in mind, it should be understood that the invention can employ various computer-implemented operations involving data stored in one or more computer systems, including for example the any user computing device. These operations are those requiring physical manipulation of physical quantities. Usually, though not necessarily, these quantities take the form of electrical or magnetic signals capable of being stored, transferred, combined, compared and otherwise manipulated.

Some embodiments of the invention include a configurable offline-first system for documenting activities and work. In some embodiments, the resource mapping system consists of a mobile application that augments data from an alpha system with sensor data and user input and sends it to a terminal system (hereinafter an omega system) via a backend process. For example, some embodiments include one or more software applications or portions of software applications created to ease the documentation of compliance and gas leak surveys. Some embodiments include a configurable offline-first system for documenting work in the field. In some embodiments, the resource mapping system consists of a mobile application that can augment data from an alpha system with sensor data and user input, sending it to an omega system via a backend process.

In some embodiments, the architecture of the resource mapping system can treat the mobile application as a transport for sensor data and user input between the alpha system and the omega system. In some embodiments, data transformations between the resource mapping systems can occur on the user's device allowing for improved real-time validation of user-inputted data. In some embodiments, this can decrease the need for back-office users to validate the data, and reduce the number of times workers are re-dispatched to the field.

Some embodiments include a mobile device application that reads data from the alpha system based on a configuration file. In some embodiments, work in the field is described as an activity and is written to an activity summary document. In some embodiments, the payload object on the activity summary is then sent to an omega system in a format described by another configuration file.

In some embodiments, the resource mapping system of configuration files can allow the resource mapping system to be both alpha system and omega system agnostic, meaning that new and/or additional alpha and omega systems can be added without significant changes to the application code of the resource mapping system. In some embodiments, the system agnostic nature also ensures the resource mapping system application to be used by any organization that needs to maintain assets in the field.

In some embodiments of the invention, the alpha system can be a system with data that need to be interacted with to create an event in another system (usually for the documentation of work). In some embodiments, in the case of creating a corrective notification, the newly created system can be a geographic information systems (GIS) database. In some further embodiments, in the case of conducting a compliance survey, the newly created system can be a work management system. In other embodiments, in the case of documenting maintenance, the newly created system can be a plant maintenance or asset management system. In some further embodiments, in the case of documenting a driven patrol, the newly created system can be the video feed from a vehicle-mounted camera.

In some embodiments, an example alpha system can comprise an Esri® geodatabase GIS and/or software implementations built on one or more SAP® or similar software module, and/or other work management systems, and/or a CC&B customer information database, and/or an asset management system, and/or a raw video feed via computer vision model, and/or one or more other coupled databases. SAP®, and the SAP® products mentioned therein are registered trademarks of SAP AG in the United States and other countries.

In some embodiments, the omega system can be a system that is able to receive data and document work. In some embodiments, the application can interact with omega systems via a system of "pollers". In some embodiments, "pollers" can read the data collected and transformed by a mobile application (known as an activity summary), and send it to an omega system. In some embodiments, if a "poller" is unable to successfully send the payload (due to omega system availability or issues with the data), a web-based tool can update the payload of the activity. In some embodiments, changes made to the activity summary can be tracked via "last edited by" metadata.

In some embodiments, once a poller successfully sends the payload to a backend system the activity summary becomes immutable. In some embodiments, pollers can be "cron jobs" or "lambdas" based on the business need.

In some embodiments, the manner in which the resource mapping system receives data is established in one or more configuration files (i.e. REST endpoint, .csv file, or email). In some embodiments, an example omega system can include a SAP® work management system, a compliance system (e.g., SAP® BW), and/or a .csv file, and/or a .pdf file, and/or email, ESFTP program (esftp.exe), and REST endpoint.

In some embodiments, the resource mapping system can enable a snapshot of what happened on the device at the time of the user interaction (e.g., such as one or more activities). In some embodiments this can be thought of as alpha system data plus sensor data plus forms plus payload, plus metadata.

Some embodiments of invention include an activity summary that is written locally and synchronized. In some embodiments, these documents are synchronized opportunistically with the backend system. In some embodiments, when combined with an activity configuration, the resource mapping system creates a human readable web page. In some embodiments, upon initial synchronization to the backend, this can be used to send data to an omega system. In some embodiments, these documents are immutable once they are sent to a backend system and can be used as a transactional record of work for auditing purposes.

Some embodiments include sensor and form data. Some embodiments include user captured data from forms (pieces of UI presented to the user for capturing data observed by the user). In some embodiments, forms contain business logic via form configurations.

Some embodiments include location data, where an on-device GPS records a user's location when actively working. Some further embodiments include camera data where users can include photographs from the device's camera or photo library. Some other embodiments include data from connected devices such as from Bluetooth® or another wired device. Bluetooth® is a registered trademark of Bluetooth SIG, Inc. Some embodiments include other metadata, including, but not limited to, date/time, location, currently logged in user, and application version.

Some embodiments of the invention include a configuration driven system. In some embodiments, configurations can be set on the server and pushed out via sync functions to automatically update without changing the code. In some embodiments, configurations can contain a value for the "minimum inspect version" so configurations that require a specific application code can fail gracefully. Some embodiments include an initial set of configurations that are pre-loaded with the application allowing graceful offline use.

Some embodiments include asset, work, or notification configuration files. In some embodiments, configuration files can follow a naming convention that hooks into the parts of one or more system application files to format data, show and/or hide functionality, and associate activities with user interactions.

In some embodiments, the configuration files can describe how to display data in various ways, including data ordering, grouping disparate data types, formatting unfriendly data types and associating human readable labels with machine readable keys. In some embodiments, these are accomplished via mapping objects, such as a key that is used to find the data from the alpha system, a "label" that is a human readable label associated with the datum, and "transform", a function by which the data is made more user friendly (e.g. date time conversions, or adding units of measure).

Some embodiments include activity configurations defining what data to collect, and a snapshot of what is happening on the device at the time of a user interaction. Some embodiments include pre-requisite hooks, a specific set of activities that must occur before the activity can be completed, selecting a location from a map, taking a reading from an instrument, and performing another activity (activity chaining).

Some embodiments include post-requisite hooks (conditions that must be met or transforms that must happen prior to activity completion.) In some embodiments, these can be used to validate business logic that is not enforceable through the form or to change the omega system entirely based on the data entered.

In some embodiments, parts of an activity can comprise a form that defines user input. In some embodiments, business logic can be encoded in the form using a variety of functions. Some embodiments include follow-ups to items with a specific set of selected options. Some further embodiments include follow-ups to items with certain value thresholds, hidden elements, element pre-population, data validation via regular expression (regex), or other value comparison.

Some embodiments include sub-forms and form elements that can link to functions inside application code for logic that cannot be easily described in the configuration. In some embodiments, when a link object is set to required and there exists no predefined form element for it, dynamic form elements can be created at runtime.

In some embodiments, a payload type that defines the omega system for the poller. Some embodiments include links, preparation of individual data for a terminal system, including, but not limited to, "linkID", a key used by the payload template, "required", a flag to determine a datum inclusion in the payload, "alphaKey", a key for finding the datum from the alpha system or form, "OmegaKey", a key that the omega system expects the datum to have, "Omega-Type", that defines how the datum needs to be transformed to be accepted by the omega system, and "Label", a human readable label for data display. Some embodiments include a template such as a DSL for formatting the payload to the requirement of the omega system (e.g., "d:<%linkID%>").

Some embodiments include an analytics pipeline. In some embodiments, the resource mapping system can allow the collection of data for deeper analysis. In some embodiments, more information than is required by compliance is collected from the field and stored in the backend system. In some embodiments, forms can by updated to include information that the business requires to make improved decisions. In some embodiments, alpha system can be swapped out once the data is improved. In some further embodiments, problems in the field can be surfaced earlier.

Some embodiments can utilize computer vision (e.g., such as computer vision with artificial intelligence). In some embodiments, the resource mapping system application can interact with computer vision models as both an alpha system or as part of the user input. In some embodiments, models can be contained on a device and work without a network connection. In some embodiments, models can be updated without pushing new application code.

In some embodiments, models can be used for object detection, including finding various objects in a video stream or still photo (e.g. picking out assets from a video stream). In some embodiments, models can be used for object classification, including determining classification of objects in a photo (e.g. determining health of an asset). In some embodiments, models can be used for optical character recognition, including transforming digital images into data usable by an omega system (e.g. reading a meter from a photograph).

In some embodiments, data from computer vision models can be inserted via extensions in the form or from a specific work mode. In some further embodiments, data collected from activities can be used train new models or improve existing models.

In some embodiments, the resource mapping system does not require a network connection to function after initial set up. In some embodiments, GIS information is downloaded on initial log in.

In some embodiments, initial configurations are bundled with the application. In some embodiments, data and configurations can be synchronized with a backend system opportunistically.

Some embodiments include data transformations on-device "ETL". In some embodiments, the mobile application handles all data transformation needed to communicate with the omega system obviating the need for an integration service on the backend. In some embodiments, the set of transforms is easily extensible and testable.

Some embodiments include the generation of one or more displays of an asset management system. For example, some embodiments include a system generation of an instrument calibration display.

Any of the operations described herein that form part of the invention are useful machine operations. The processes and method steps performed within the resource mapping system architectures of FIGS. 46-48 cannot be performed in the human mind or derived by a human using pen and paper, but require machine operations to process input data to useful output data.

The invention also relates to a device or an apparatus for performing these operations. The apparatus can be specially constructed for the required purpose, such as a special purpose computer (i.e., in some embodiments, the computing device can be constructed for a special purpose). When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage, or in particular formats that enable the construction or depiction of a physical and tangible object. In some embodiments, the manipulation can be performed by at least one processor. In such an example, the at least one processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and can include without limitation volatile and non-volatile, removable and non-removable storage media implemented in any method or technology for the tangible storage of information such as computer-readable instructions, data structures, program modules or other data.

Although method operations may be described in a specific order, it should be understood that other housekeeping operations may be performed in between operations, or operations may be adjusted so that they occur at slightly different times, or may be distributed in a system which can allow the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the disclosure, figures, and claims herein.

The invention claimed is:

1. A server system comprising:
a computing device including at least one processor, the computing device configured to be coupled to a communications network for communications with at least one user device including at least one user display; and
a non-transitory computer-readable storage medium for tangibly storing thereon program logic for execution by the at least one processor, the program logic comprising:
logic executable by the at least one processor for receiving at least one data communication from the at least one user device;
logic executed by the at least one processor to generate and display at least one graphical user interface (GUI) on the at least one user display coupled to the communications network;
logic executed by the at least one processor to communicatively couple to at least one mapping database comprising mapping data;
logic executed by the at least one processor to communicatively couple to at least one asset or infrastructure database comprising asset or infrastructure data;
logic executed by the at least one processor to receive location data from the at least one user device and a server communicatively coupled to the at least one user device;
logic executed by the at least one processor to receive at least a portion of the mapping data from the at least one mapping database and display at least a portion of at least one map on a display of the at least one user device based at least in part on the mapping data;
logic executed by the at least one processor to process and display information derived from at least a portion of the asset or infrastructure data based on at least one condition;
wherein the at least one condition comprises a physical location of an asset or infrastructure relative to an area or region displayed by the at least one map; and
wherein the information comprises a near real-time or real-time resource or asset analysis.

2. The server system of claim 1, wherein the at least one map includes an overlay of at least one of satellite imagery, a fire operational layer, an outage layer, and a fire layer.

3. The server system of claim 2, wherein the fire layer comprises at least one of an active fire and an active fire perimeter.

4. A server system comprising:
- a computing device including at least one processor, the computing device configured to be coupled to a communications network and at least one user device coupled to the communications network;
- at least one mapping database comprising mapping data;
- at least one asset or infrastructure database comprising asset or infrastructure data;
- a non-transitory computer-readable storage medium for tangibly storing thereon program logic for execution by the at least one processor, the program logic comprising:
- logic executable by the at least one processor for receiving at least one data communication from the at least one user device and for causing at least one graphical user interface (GUI) to be displayed on a display of the at least one user device;
- logic executed by the at least one processor to receive location data from the at least one user device and a server communicatively coupled to the at least one user device;
- logic executed by the at least one processor to utilize at least a portion of the mapping data to display at least a portion of at least one map on the display; and
- logic executed by the at least one processor to utilize at least a portion of the asset or infrastructure data to display asset or infrastructure information on the display;
- wherein the location data is based at least in part on at least one of a physical location of the at least one user device and geo-positional data received from the at least one user device; and
- wherein the asset or infrastructure information comprises a near real-time or real-time resource or asset analysis.

5. The server system of claim 4, wherein the at least one map includes a representation of an area that is a specified distance from the physical location of the at least one user device.

6. The server system of claim 4, wherein the at least one map includes a representation of at least one asset.

7. The server system of claim 6, wherein the at least one asset comprises infrastructure related to delivery of at least one of electricity, fuel, and water.

8. The server system of claim 4, wherein the at least one map includes a representation of at least one ongoing or past emergency.

9. The server system of claim 4, further comprising logic executed by the at least one processor to generate and display at least one of a user-selectable menu, an information or data field, and a toggle, on the at least one graphical user interface (GUI).

10. The server system of claim 9, wherein the information or data field comprises at least one of field intelligence, service location, asset infrastructure, asset attributes, emergency information, safety information, satellite imagery, status of assets, asset use, a response of assets to an environmental factor or human-made phenomenon.

11. The server system of claim 9, wherein the user-selectable menu comprises at least one of a sharing function, email function, a notes function, a copy or save function, and a directions function.

12. The server system of claim 4, wherein the at least one data communication comprises user input to at least one of a user selectable menu, an information or data field, and a toggle.

13. The server system of claim 2, wherein the outage layer comprises at least one of a display of an outage and an outage perimeter.

14. The server system of claim 4, further comprising logic executable by the at least one processor to process at least one asset search request from the at least one user device, and based on a result of the at least one asset search request, displaying at least one of a location of at least one asset, a graphical representation of at least one asset, an asset name, asset structure or component information, and resource information of the asset.

15. The server system of claim 1, wherein the at least one condition comprises a physical location of the asset or infrastructure relative to an area or region displayed by the at least one map.

16. The server system of claim 1, wherein the at least one condition comprises the at least one data communication, user-input to the at least one user display, an emergency or safety alert or condition related to the asset or infrastructure or based on an area or region displayed by the at least one map.

17. The server system of claim 4, further comprising logic executed by the at least one processor to display information related to at least one of an emergency or safety alert or condition related to the asset or infrastructure data, and response or status of assets or infrastructure to an environmental factor or human-made phenomenon.

18. A server system comprising:
- a computing device including at least one processor, the computing device configured to be coupled to a communications network and at least one user device coupled to the communications network;
- at least one mapping database comprising mapping data;
- at least one asset or infrastructure database comprising asset or infrastructure data;
- a non-transitory computer-readable storage medium for tangibly storing thereon program logic for execution by the at least one processor, the program logic comprising:
- logic executable by the at least one processor for receiving at least one data communication from the at least one user device and for causing at least one graphical user interface (GUI) to be displayed on a display of the at least one user device;
- logic executed by the at least one processor to receive location data from the at least one user device and a server communicatively coupled to the at least one user device;
- logic executed by the at least one processor to utilize at least a portion of the location data to display at least a portion of at least one map on the display; and
- logic executed by the at least one processor to utilize at least a portion of the asset or infrastructure data to display asset or infrastructure information on the display;
- wherein the location data is based at least in part on at least one of a physical location of the at least one user device and geo-positional data received from the at least one user device; and
- wherein the asset or infrastructure information comprises a near real-time or real-time resource or asset analysis.

* * * * *